United States Patent
Ueda et al.

(10) Patent No.: US 9,237,504 B2
(45) Date of Patent: Jan. 12, 2016

(54) COMMUNICATION SYSTEM, INFORMATION PROCESSING DEVICE AND FEMTO BASE STATION THEREIN, METHOD AND PROGRAM FOR CONTROLLING THE SAMES, AND METHOD OF TRANSMITTING INFORMATION TO FEMTO BASE STATION

(75) Inventors: Yoshio Ueda, Tokyo (JP); Masato Shindo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/817,308

(22) PCT Filed: Aug. 12, 2011

(86) PCT No.: PCT/JP2011/004574
§ 371 (c)(1),
(2), (4) Date: Feb. 15, 2013

(87) PCT Pub. No.: WO2012/026086
PCT Pub. Date: Mar. 1, 2012

(65) Prior Publication Data
US 2013/0150050 A1    Jun. 13, 2013

(30) Foreign Application Priority Data
Aug. 26, 2010    (JP) .................................. 2010-189046

(51) Int. Cl.
*H04W 36/00* (2009.01)
*H04W 36/38* (2009.01)
(Continued)

(52) U.S. Cl.
CPC .............. *H04W 36/38* (2013.01); *H04W 48/04* (2013.01); *H04W 84/045* (2013.01)

(58) Field of Classification Search
CPC ..... H04W 36/30; H04W 36/18; H04W 36/08; H04W 36/14; H04W 36/12
USPC ................................................... 455/436–444
See application file for complete search history.

(56) References Cited

U.S. PATENT DOCUMENTS

| | | | |
|---|---|---|---|
| 6,021,125 A * | 2/2000 | Sakoda et al. ................. 370/345 |
| 2005/0064856 A1 * | 3/2005 | Atkin et al. .................... 455/418 |

(Continued)

FOREIGN PATENT DOCUMENTS

| | | |
|---|---|---|
| JP | 2006-041961 A | 2/2006 |
| JP | 2009-049564 A | 3/2009 |

(Continued)

OTHER PUBLICATIONS

Communication dated Aug. 20, 2014, issued by the Russian Patent Office in counterpart Application No. 2013108266/08.

(Continued)

*Primary Examiner* — Vladimir Magloire
*Assistant Examiner* — Juan C Perez Tolentino
(74) *Attorney, Agent, or Firm* — Sughrue Mion, PLLC

(57) ABSTRACT

In order to change control over a user equipment within a femtocell in accordance with a change in camping of the user equipment, a communication system includes a femto base station (10) that provides a femtocell includes notification destination setting means (20) for setting, in the femto base station (10), a notification destination to be notified of a change in camping of a user equipment (30) on the femtocell. The femto base station (10) notifies the set notification destination of the change in camping of the user equipment (30), upon detection of the change in camping.

3 Claims, 19 Drawing Sheets

(51) Int. Cl.
    *H04W 48/04*     (2009.01)
    *H04W 84/04*     (2009.01)

(56) References Cited

U.S. PATENT DOCUMENTS

2010/0041364 A1   2/2010  Lott et al.
2010/0227605 A1*  9/2010  Fournier .................. 455/419
2011/0275347 A1* 11/2011  Aoyagi et al. ............ 455/411

FOREIGN PATENT DOCUMENTS

| JP | 2009-182620 A | 8/2009 |
|---|---|---|
| JP | 2009-188629 A | 8/2009 |
| JP | 2010-502063 A | 1/2010 |
| JP | 2010-062711 A | 3/2010 |
| RU | 2 160 976 C2 | 12/2000 |
| RU | 2 193 287 C2 | 11/2002 |
| RU | 2355121 C2 | 4/2008 |
| WO | 2005091593 A1 | 9/2005 |
| WO | 2010/058841 A1 | 5/2010 |

OTHER PUBLICATIONS

Communication dated Nov. 10, 2014, issued by the Russian Patent Office in counterpart Russian application No. 2013108266.

* cited by examiner

CN Level Parameters 108

| Parameter | Description/Note | Presence | 3GPP Reference |
|---|---|---|---|
| PLMN Type | "GSM-MAP" or "ANSI-41" | M | 25.331, sec.10.3.1.12 |
| MCC | Mobile Country Code | M | 24.008<br>32.642sec.6.3.8 |
| MNC | Mobile Network Code | M | 24.008<br>32.642sec.6.3.8 |
| LAC | Location Area Code (one or more LACs may be provided) | M (Note1) | 24.008, sec.10.5.1.3<br>32.642sec.6.3.9 |
| SAC | Service Area Code | M | 25.413, sec.9.2.3.9<br>32.642sec.6.3.9 |
| T3212 | Periodic LAU timer (CS domain) | M | 24.008, sec.10.5.1.12.2 |
| ATT | Attach-detach allowed (CS domain) | M | 24.008, sec.10.5.1.12.2 |
| RAC | Routing area code (PS domain) (one or more RACs may be provided) | M (Note1) | 24.008, sec.10.5.1.12.3<br>25.413, sec.9.2.3.7<br>32.642sec.6.3.9 |
| NMO | Network Mode of Operation (Gs i/f) | M | 24.008, sec.10.5.1.12.3 |
| Equivalent PLMN ID | List of one or more equivalent PLMN ID (MCC+MNC) | O (Note2) | 24.008, sec.10.5.1.13 |
| Allowed IMSI list | For access control or membership verification purposes. | O (Note3) | 24.008, sec.10.5.1.4 |
| CSG Cell Info | CSG Capability Indication, CSG Id, in case the Cell is CSG capable (any further detail per Rel.8 RRC spec) | M | Applicable to Rel.8 compliant cell only. |
| HNB Location Information | Location information (Geographical coordinates, Uncertainty code) | O | 25.413, sec.9.2.3.11 |
| SAI for broadcast | Service Area for broadcast | M | 25.419, sec.9.2.11 |
| Monitored IMSI List and Destination Information for mobility related notification | The combined list of IMSI(s) of UE(s) monitored by HNB and Destination Information (e.g. IP Address or hostname of Server or IP capable device) for mobility related notification | O | 24.008, sec.10.5.1.4 |
| NOTE1: May be a list/range of values in case the HNB has auto-configuration capabilities. | | | |
| NOTE2: This information is operator-dependent based on its circumstance. | | | |
| NOTE3: ACL is an optional function at HNB. This information is provided if this function is enabled in the HNB. | | | |

Fig. 7

HNB Access Network (HNB Access Network Related Parameter Types) 108

| Parameter Type | Description | Reference |
|---|---|---|
| HNB-GW Gateway Identity | Identity of the HNB-GW the HNB connects to. The type of identity may be either "name" or IP address. | 25.467 |
| Security Gateway Identity | Identity of the Security GW the HNB connects to. The type of identity may be either "name" or IP address. | 25.467 |
| Access Mode | Indicates the type of access mode the HNB is to operate, it can be either "Open Access," "Closed Access," or "Hybrid Access." | 22.011 |
| ACL list | Defines the ACL, which consists of one or more IMSI of the UE that the access to the HNB is allowed. It is applicable to either "Closed Access" and "Hybrid Access." | 22.011 |
| Monitored IMSI List and Destination Information for mobility related notification | The combined list of IMSI(s) of UE(s) monitored by HNB and Destination Information (e.g. IP Addess or hostname of Server or IP capable device) for mobility related notification | 25.467 |
| CSG Identity | Defines the CSG ID to which the HNB is a member of. It consists of one or more than one CSG ID. | 22.011 |
| CSG specific info | Defines the CSG specific split Information including Primary Scrambling Code (PSC) and UARFCN dedicated to the CSG. This information is intended in the BCCH SIB information for the UEs under the HNB. | 25.331, 10.3.2.8, 10.3.2.9 10.2.48.8.14a |
| ... | | |
| Inter-RAT neighbour list | Inter-RAT neighbour list (GSM only) parameters including: 1) PLMN-ID, 2) LAC, 3) BSIC, 4) Band Indicator, BCCH ARF CN. | 25.413, sec.9.2.3.33, 23.003sec.4.1.51.011, sec10.3.42, 24.008 |
| State management related parameters | State management related parameters such as: 1) enable/disable (operational state), 2) lock/unlock (administrative state) | 32.671 |

Fig. 8

PARAMETER 108 OF TR-196

| Name | Type | Write | Description | Object Default |
|---|---|---|---|---|
| FAPService.{i}.Presence Mgmt. | object | - | This object contains parameters relating to Presence Management and includes the combined list of IMSI(s) of UE(s) monitored by HNB and Destination Information (e.g. IP Address or hostname of Server or IP capable device) for mobility related notification | - |
| MonitoredIMSIList | string(1024) | W | Comma-separated list (maximum length 1024) of strings (maximum item length 15). Each entry is an IMSI. | - |
| NotmonitoredIMSIList | string(1024) | W | Comma-separated list (maximum length 1024) of strings (maximum item length 15). Each entry is an IMSI. | - |
| MaxMemberDetailEntries | unsignedInt | - | The maximum number of entries available in the .PresenceMgmnt.MemberDetail.{i}.table. | - |
| MemberDetailNumberOfEntries | unsignedInt | - | The number of entries in the .PresenceMgmnt.MemberDetail.{i}.table. | - |
| FAPService.{i}.PresenceMgmtMemberDetail.{i}. | object | W | | - |
| Enable | boolean | W | Enables or disables the MemberDetail entry. | false |
| IMSI | string(15) | W | International Mobile Subscriber Identity of the UE. | <Empty> |
| DestinatioinIPAddress | string(64) | W | Destination IP Address (e.g. IP Address of Server or IP capable device for mobility related notification). An empty string indicates no destination IP address is specified. | <Empty> |
| DestinatioinHostname | string(64) | W | Hostname (e.g. Hostname of Server or IP capable device for mobility related notification). An empty string indicates no destination hostname is specified. | <Empty> |

Fig. 9

HNB REGISTER ACCEPT 109

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| RNC-ID | M | | 9.2.26 | | YES | reject |
| Mux Port Number | O | | 9.2.29 | The mux port number at which HNB-GW expects to receive multiplexed packets. | YES | ignore |
| Monitored IMSI List | O | | | | YES | ignore |
| >Monitored IMSI IEs | | 1 to <maxnoof IMSIs> | | | EACH | ignore |
| >>IMSI | O | | | | | |
| >>Destination IP Address | O | | | | | |
| >>Destination Hostname | O | | | | | |
| NotMonitored IMSI List | O | | | | YES | ignore |
| >Not Monitored IMSI IEs | | 1 to <maxnoof IMSIs> | | | EACH | ignore |
| >>IMSI | O | | | | | |
| >>Destination IP Address | O | | | | | |
| >>Destination Hostname | O | | | | | |

Fig. 11

| CELL ID | CSG ID | IMSI | ACTION | USE CASE |
|---|---|---|---|---|
| 1000 | 10000 | OTHER THAN #A | DEACTIVATE CAMERA FUNCTION | DEACTIVATE CAMERA FUNCTION OF UE OTHER THAN THAT OF SALESPERSON (#A) IN BOOKSTORE |
| 1001 | N/A | ALL | SWITCH MODE TO DRIVE MODE | SWITCH MODE TO DRIVE MODE IN DRIVEWAY |
| 1002 | 20000 | OTHER THAN #B | SWITCH MODE TO MANNER MODE | SWITCH MODE OF UE OTHER THAN THAT OF SPECIFIC CREW (#B) TO MANNER MODE IN BUS |
| 2011 | N/A | ALL | DEACTIVATE GPS FUNCTION | DEACTIVATE GPS FUNCTIONS OF ALL USERS IN UNDERGROUND MALL |
| 2012 | N/A | ALL | DEACTIVATE GPS FUNCTION | DEACTIVATE GPS FUNCTIONS OF ALL USERS IN UNDERGROUND MALL |
| 2013 | N/A | ALL | DEACTIVATE GPS FUNCTION | DEACTIVATE GPS FUNCTIONS OF ALL USERS IN UNDERGROUND MALL |
| 2015 | 30000 | #C, #D, #E, #F | ACTIVATE GPS FUNCTION | AUTOMATICALLY ACTIVATE GPS FUNCTIONS OF ONLY REGISTERED MEMBERS TO PARTICIPATE IN LOCATION-BASED GAME |

S1 SETUP RESPONSE 209, 210

| IE/Groupe Name | Presence | Range | IE Type and Reference | Semantics description | Criticality | Assigned Criticality |
|---|---|---|---|---|---|---|
| Message Type | M | | 9.2.1.1 | | YES | reject |
| MMEName | O | | Printable String(1 ...150, ---) | | YES | ignore |
| Served GUMMEIs | | 1... <maxnoofRATs> | | The LTE related pool configuration is included on the first place in the list. | GLOBAL | reject |
| >Served PLMNs | | 1... <maxnoofPLMNsPerMME> | | | - | |
| >>PLMN Identity | M | | 9.2.3.8 | | - | |
| >Served Group IDs | | 1... <maxnoofGroupIDs> | | | - | |
| >>MME Group ID | M | | OCTET STRING(2) | | - | |
| >Served MMECs | | 1... <maxnoofMMECs> | | | - | |
| >>MME Code | M | | 9.2.3.12 | | | |
| Relative MME | M | | 9.2.3.17 | | YES | ignore |
| Criticality | O | | 9.2.1.21 | | YES | ignore |
| >Monitored IMSI List | O | 1to <maxnoofIMSIs> | | | YES | ignore |
| >Monitored IMSI IEs | | | | | EACH | ignore |
| >>IMSI | O | | | | | |
| >>Destination IP Address | O | | | | | |
| >>Destination | O | | | | | |
| Not Monitored IMSI List | O | 1to <maxnoofIMSIs> | | | YES | ignore |
| >Not Monitored IMSI IEs | | | | | EACH | ignore |
| >>IMSI | O | | | | | |
| >>Destination IP Address | O | | | | | |
| >>Destination | O | | | | | |

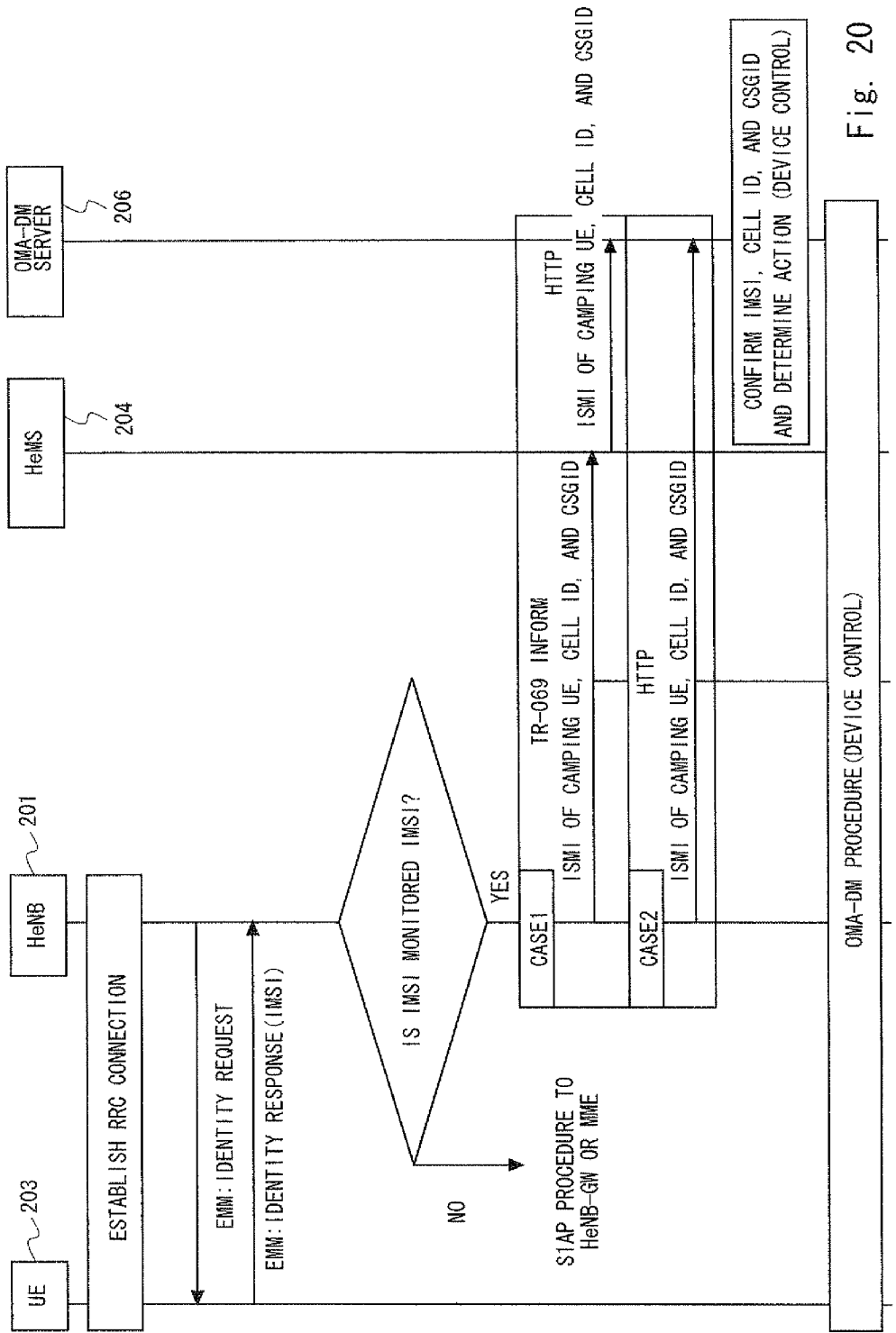

COMMUNICATION SYSTEM, INFORMATION PROCESSING DEVICE AND FEMTO BASE STATION THEREIN, METHOD AND PROGRAM FOR CONTROLLING THE SAMES, AND METHOD OF TRANSMITTING INFORMATION TO FEMTO BASE STATION

CROSS REFERENCE TO RELATED APPLICATIONS

This application is a National Stage of International Application No. PCT/JP2011/004574, filed on Aug. 12, 2011, which claims priority from Japanese Patent Application No. 2010-189046, filed Aug. 26, 2010, the contents of all of which are incorporated herein by reference in their entirety.

TECHNICAL FIELD

The present invention relates to a communication processing technique to provide, in a communication system that provides a femtocell, an improved control over camping on the femtocell.

BACKGROUND ART

PTL 1 discloses a technique in which a terminal control server controls functions of a mobile terminal in accordance with an instruction from an instruction terminal.

PTL 2 discloses a technique in which the provision of services by a service providing terminal, which can be used in a femtocell, is permitted when a mobile station camps on the femtocell, and is restricted when the mobile station does not camp on the femtocell.

PTL 3 discloses a technique in which a mobile terminal determines a movement from a cell managed by a public radio base station to a cell managed by a private base station (for example, in an office or a house) that restricts the use of the mobile terminal to a specific user, by use of an IMSI included in an RFID tag.

PTL 4 discloses a technique in which validation/invalidation of services to a user equipment in a communication network is controlled through a device management object.

CITATION LIST

Patent Literature

PTL 1: Japanese Unexamined Patent Application Publication No. 2009-049564
PTL 2: Japanese Unexamined Patent Application Publication No. 2009-188629
PTL 3: Japanese Unexamined Patent Application Publication No. 2010-062711
PTL 4: Japanese Unexamined Patent Application Publication No. 2010-502063

SUMMARY OF INVENTION

Technical Problem

However, in the related arts described above, a user equipment management server that manages a user equipment is disposed at the core network side. This also applies to 3GPP TS23.0035.17 Configuration of Home (e)NodeB entities. There has been no interface with a base station for controlling a femtocell, or with a gateway. There has been no method for a base station management server, which manages a base station, to notify the base station of a user equipment to be monitored or a user equipment that need not be monitored. There has been no method for the base station management server to set, in a base station, a notification destination (a user equipment management server, a presence server, an application server, an IP-compatible device, etc.) to be notified that the user equipment camps on a femtocell when the user equipment camps on the femto cell. In addition, the setting of the method for controlling over the user equipment can be changed only when a carrier (operator) updates the firmware of the user equipment management server, for example. However, the owner of the base station cannot change the method for controlling over the user equipment.

It is one exemplary object of the present invention to provide a technique for solving the above-mentioned problems.

Solution to Problem

In order to achieve the above-mentioned object, a system according to a first exemplary aspect of the present invention is a communication system including a femto base station that provides a femtocell. The communication system includes notification destination setting means for setting, in the femto base station, a notification designation to be notified of a change in camping of a user equipment on the femtocell. The femto base station notifies the set notification destination of the change in camping of the user equipment, upon detecting the change in camping.

In order to achieve the above-mentioned object, a method according to a second exemplary aspect of the present invention provides a control method for a communication system that provides a femtocell. This control method includes: a notification destination setting step of setting, in the femto base station, a notification destination to be notified of a change in camping of a user equipment on the femtocell; and a change-in-camping notification step of notifying, by the femto base station, the set notification destination of the change in camping of the user equipment, upon detecting the change in camping.

In order to achieve the above-mentioned object, a device according to a third exemplary aspect of the present invention is an information processing device that manages a user equipment in a communication system that provides a femtocell. This information processing device includes: storage means for storing restriction or addition of a function of the user equipment in association with at least a cell ID for identifying the femtocell; reception means for receiving a change in camping of the user equipment on the femtocell from a femto base station having detected the change in camping, the change in camping being notified to a notification destination, the notification destination representing the information processing device and being preliminarily set in the femto base station; and management means for restricting or adding the function of the user equipment stored in the storage means upon receiving a change in the user equipment moving from an outside of coverage of the femtocell to an inside of the coverage, and for canceling the restriction or addition of the function of the user equipment upon receiving a change in the user equipment moving from the inside of the coverage to the outside of the coverage.

In order to achieve the above-mentioned object, a method according to a fourth exemplary aspect of the present invention provides a control method for an information processing device that manages a user equipment in a communication system providing a femtocell. This control method includes: a reception step of receiving a change in camping of the user equipment on the femtocell from a femto base station having detected the change in camping, the change in camping being notified to a notification destination, the notification destination representing the information processing device and being preliminarily set in the femto base station; and a management step of restricting or adding a function of the user equipment stored in storage means in association with at least a cell ID for identifying the femtocell upon receiving a change in the user equipment moving from an outside of a coverage of the femtocell to an inside of the coverage, and canceling the restriction or addition of the function of the user equipment upon receiving a change in the user equipment moving from the inside of the coverage to the outside of the coverage.

In order to achieve the above-mentioned object, a program according to a fifth exemplary aspect of the present invention is a control program for an information processing device that manages a user equipment in a communication system providing a femtocell. This control program causes a computer to execute: a reception step of receiving a change in camping of the user equipment on the femtocell from a femto base station having detected the change in camping, the change in camping being notified to a notification destination, the notification destination representing the information processing device and being preliminarily set in the femto base station; and a management step of restricting or adding a function of the user equipment stored in storage means in association with at least a cell ID for identifying the femtocell upon receiving a change in the user equipment moving from an outside of coverage of the femtocell to an inside of the coverage, and canceling the restriction or addition of the function of the user equipment upon receiving a change in the user equipment moving from the inside of the coverage to the outside of the coverage.

In order to achieve the above-mentioned object, a device according to a sixth exemplary aspect of the present invention is an information processing device that manages a service to a user in a communication system providing a femtocell. This information processing device includes: storage means for storing the service to the user in association with at least a cell ID for identifying the femtocell; reception means for receiving a change in camping of the user equipment on the femtocell from a femto base station having detected the change in camping, the change in camping being notified to a notification destination, the notification destination representing the information processing device and being preliminarily set in the femto base station; and management means for starting the service to the user stored in the storage means upon receiving a change in the user equipment moving from an outside of a coverage of the femtocell to an inside of the coverage, and for canceling the service to the user upon receiving a change in the user equipment moving from the inside of the coverage to the outside of the coverage.

In order to achieve the above-mentioned object, a method according to a seventh exemplary aspect of the present invention provides an information transmission method of transmitting information to a femto base station that controls a femtocell. This information transmission method includes transmitting, to the femto base station, a notification destination to be notified of a change in camping of a user equipment on the femtocell, as a part of transmission data compliant with a standard protocol.

In order to achieve the above-mentioned object, a device according to an eighth exemplary aspect of the present invention is a femto base station that controls a user equipment within a femtocell in a communication system providing the femtocell. This femto base station includes: reception means for receiving a notification destination to be notified of a change in camping of the user equipment on the femtocell; and notification means for notifying the received notification destination of the change in camping of the user equipment, upon detection of the change in camping.

In order to achieve the above-mentioned object, a method according to a ninth exemplary aspect of the present invention provides a control method for a femto base station that controls a femtocell in a communication system providing the femtocell. This control method includes: a reception step of receiving a notification destination to be notified of a change in camping of a user equipment on the femtocell; and a notification step of notifying the received notification destination of the change in camping of the user equipment, upon detection of the change in camping.

In order to achieve the above-mentioned object, a program according to a tenth exemplary aspect of the present invention is a control program for a femto base station that controls a femtocell in a communication system providing the femtocell. This control program causes a computer to execute: a reception step of receiving a notification destination to be notified of a change in camping of a user equipment on the femtocell; and a notification step of notifying the received notification destination of the change in camping of the user equipment, upon detection of the change in camping.

Advantageous Effects of Invention

According to the present invention, it is possible to change the control over a user equipment within a femtocell in accordance with a change in camping of the user equipment.

BRIEF DESCRIPTION OF DRAWINGS

FIG. 7 is a diagram showing an example of transmission data which is stored in a database unit 703 shown in FIG. 6 and which is transmitted to the HNB;

FIG. 8 is a diagram showing another example of the transmission data which is stored in the database unit 703 shown in FIG. 6 and which is transmitted to the HNB;

FIG. 9 is a diagram showing further another example of the transmission data which is stored in the database unit 703 shown in FIG. 6 and which is transmitted to the HNB;

FIG. 11 is a diagram showing an example of transmission data which is stored in a database unit 903 shown in FIG. 10 and which is transmitted to the HNB;

FIG. 13 is a diagram showing an example of processing for a user equipment, which is located within coverage, to be stored in a database unit 803 shown in FIG. 12;

FIG. 18 is a diagram showing an example of transmission data which is stored in a database unit of an HeNB-GW and which is transmitted to an HNB according to the third exemplary embodiment;

FIG. 20 is a sequence diagram showing an example of a change-in-camping notification sequence in the communication system according to the third exemplary embodiment.

DESCRIPTION OF EMBODIMENTS

Hereinafter, exemplary embodiments of the present invention will be described with reference to the drawings. Meanwhile, the elements described in the following exemplary embodiments are illustrated by way of example only, and the technical scope of the present invention is not limited to these elements.

First Exemplary Embodiment

Figure 1:
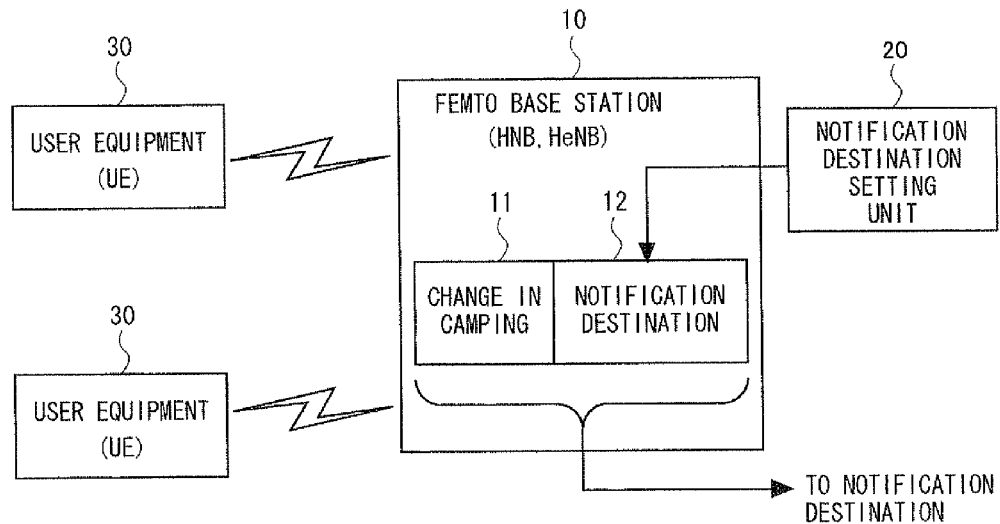
FIG. 1 is a block diagram showing a configuration example of a communication system according to a first exemplary embodiment of the present invention.

A communication system according to a first exemplary embodiment of the present invention will be described with reference to FIG. 1. FIG. 1 shows a configuration example of a communication system in which a femto stations (HNB, HeNB) notifies a set notification destination of a change in camping of a user equipment (UE) on coverage. Referring to FIG. 1, the communication system includes a femto base station 10 that provides a femtocell, and also includes a notification destination setting unit 20 that sets, in the femto base station 10, a notification destination to be notified of a change in camping of each user equipment 30 on the femtocell. Upon detecting a change in camping of the user equipment 30, the femto base station 10 notifies the set notification destination of the change in camping of the user equipment. The "change in camping" includes a case where the user equipment 30 moves from the outside of the coverage of the femtocell, which is controlled by the femto base station 10, to the inside of the coverage of the femtocell, and a case where the user equipment 30 moves from the inside of the coverage of the femtocell, which is controlled by the femto base station 10, to the outside of the coverage of the femtocell. This configuration enables the femto base station to transmit the change in camping of the user equipment to a set desired notification destination, instead of notifying a preliminarily specified notification destination of the change in camping of the user equipment. Accordingly, selection of a transmission destination capable of changing the control over the user equipment makes it possible to change the control over the user equipment within the femtocell in accordance with the change in camping of the user equipment. Therefore, this exemplary embodiment also provides another feature as a method of transmitting information to the femto base station 10.

Second Exemplary Embodiment

According to this exemplary embodiment, in a communication system that forms a femtocell, a list of IMSIs (International Mobile Subscriber Identities) to be reported and a hostname (FQDN (Fully Qualified Domain Name) format) or IP (Internet Protocol) address information of an OMA-DM server of a report destination are registered in the femtocell based on TR-069. When the UE is located in the coverage of the femtocell or moves away from the femtocell, it is notified to the OMA-DM server having the designated hostname (FQDN format) or IP address. Thus, the OMA-DM server has a feature that can perform device control over a mobile terminal based on an OMA-DM protocol in accordance with a predetermined policy.

<Explanation of Terms used in this Exemplary Embodiment>
(Femtocell)

The term "femtocell" generally refers to a small base station having a range within a radius of several tens of meters. As a use case, the femtocell is assumed to be installed in a house or a company. The femtocell is installed mainly for the purpose of (1) improving the coverage, (2) increasing the throughput, (3) reducing traffic within a mobile carrier by a data offload function to thereby reduce an OPEX (Operating Expense), and (4) reducing accounting during use of the femtocell. The femtocell has an advantage that the location of a user can be specified when the UE camps on such a small base station. As a well-known location estimation method other than the femtocell, a GPS (Global Positioning System) can specify the location of a user. However, the femtocell has the following advantages over the GPS method.

In GPS measurement, there is a concern about battery duration when the frequency of UE position measurement is high.

There is a concern about the satellite measurement sensitivity within a building by the GPS.

It is difficult for the GPS to detect a floor in a building or the like.

Thus, specifying the location of the UE by the femtocell provides the above-mentioned advantages, as compared with the case of using the GPS. In this exemplary embodiment, the terms "femtocell" and "HNB" are used as synonyms that indicate the same meaning.

(TR-069)

The term "TR-069" (Technical Report 069) refers to a technical specification of CPE-WAN Management Protocol (CWMP) specified by Broadband Forum. This technical specification defines a protocol for remote management of an end user equipment. The TR-069 is a bidirectional protocol based on SOAP (Simple Object Access Protocol)/HTTP (Hyper Text Transfer Protocol). Accordingly, this defines a communication between CPE (equipment that connects WAN (Wide Area Network) and a client network) and ACS (Automatic Configuration Servers). In a femto system, the CPE corresponds to the HNB or HeNB, and the ACS corresponds to the HMS or HeMS.

(TR-196)

The TR-196 defines a standard data model (Femto Access Point Service Data Model) for a femtocell (HNB or HeNB) defined by the Broadband Forum.

(OMA-DM)

The term "OMA-DM" is an abbreviation of "open mobile alliance-device management", and refers to a device management function developed by Open Mobile Alliance that promotes the standardization of mobile-related applications. The OMA-DM performs device management using XML (Extensible Markup Language) for data exchange, and is carried out through a communication between a device management server and a device (client to be managed). The OMA-DM supports various protocols for data transfer in physical interfaces including both a wired interface (USB (Universal Serial Bus), RS (Recommended Standard)-232) and a wireless interface (GSM (Global System for Mobile Communications), W-CDMA (Wideband Code Multiple Access), IrDA (Infrared Data Association), Bluetooth, LTE, etc.). The communication is asynchronously activated by the OMA-DM server by using a method such as WAP (Wireless Application Protocol) Push or SMS (Short Message Service).

Accordingly, if the femto base station notifies the OMA-DM of the change in camping on the femtocell, the following effects can be achieved.

(1) By utilizing the locality of the femtocell, the OMA-DM server is immediately notified that the user equipment camps on the femtocell or moves away from the femtocell. Accordingly, a real-time device control (switching to a manner mode/drive mode, permission/prohibition of a specific device in a mobile phone) is implemented.

(2) Web access such as the Internet enables the owner of the HNB to flexibly set the device control method.

(3) It is possible to provide services within the coverage by utilizing the locality of the femtocell, and to perform a home electronic appliance/equipment corporation with an IP-compatible device within a house or a company.

<Configuration Example of Communication System According to Second Exemplary Embodiment>

The configuration of the communication system according to the second exemplary embodiment of the present invention will be described with reference to FIG. 2.

Figure 2:
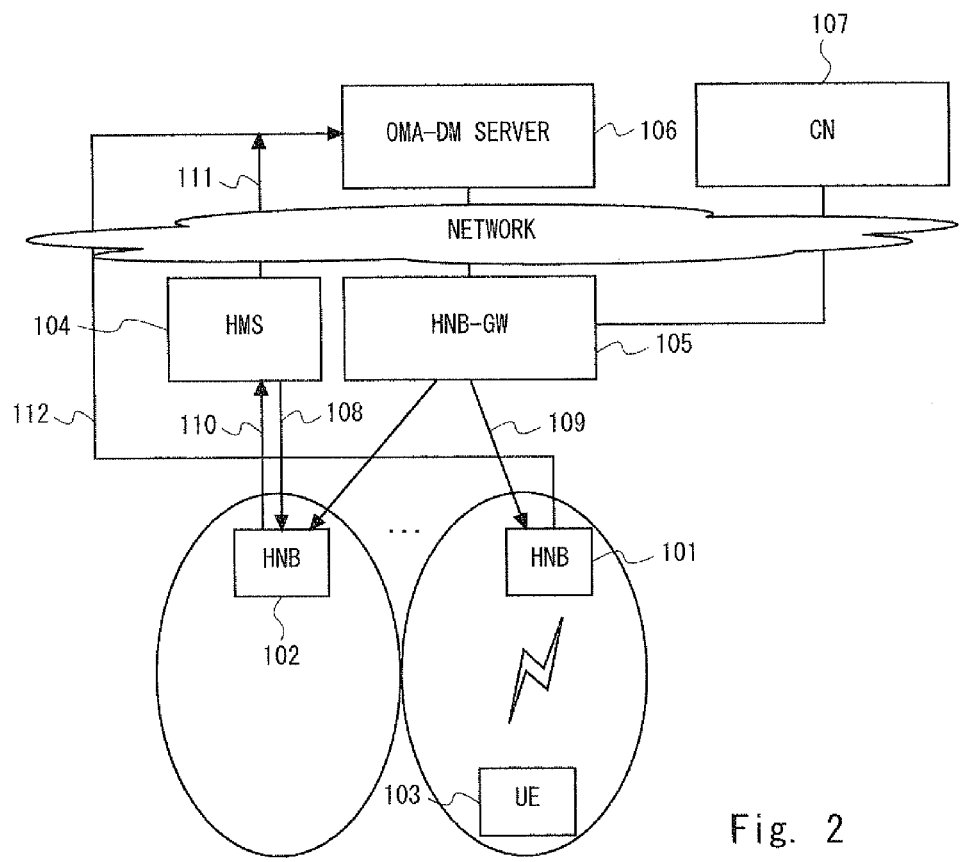
FIG. 2 is a block diagram showing a configuration example of a communication system according to a second exemplary embodiment of the present invention.

Referring to FIG. 2, each of HNBs (3G Home NodeB) 101 and 102 is referred to as a femto base station, and indicates a small base station compatible with a third-generation radio system (W-CDMA). An HMS (Home NodeB Management System) 104 is a maintenance management server for controlling the HNBs 101 and 102. The HNBs 101 and 102 are gateways which are connected to an HNB-GW (3G HNB Gateway) and communicate with a core network (CN) via the HNB-GW.

Referring to FIG. 2, the HMS provides the HNBs with "monitored mobile terminal information" (UE information monitored by HNBs), which is introduced in this exemplary embodiment, by using TR-069 protocol. The HNB monitors a UE entering the coverage of the HNB or a UE moving out of the coverage of the HNB, on the bases of the monitored mobile terminal information. When the UE moves to the coverage of the HNB or moves away from the coverage of the HNB, the HNB confirms the monitored mobile terminal information. When the IMSI of the UE is included in the monitored mobile terminal information, an OMA-DM server 106, which is designated by the hostname (FQDN format) or IP address in the monitored mobile terminal information, is notified of the change in camping of the UE on the coverage. The OMA-DM server identifies the HNB using the cell ID or the like, and activates the OMA-DM protocol for the UE in accordance with a predetermined action to perform an appropriate device control. As a result, upon detecting that the UE to be monitored camps on the HNB in a bookstore or a museum, for example, the HNB notifies it to the OMA-DM server, which enables a camera device of the UE to be deactivated. This makes it possible to prevent the user from taking a picture of a page in a book, for which the user has not paid, without permission by using the camera function of a mobile phone. This also makes it possible to prevent the user from taking a picture of a work of art, which is prohibited also in the museum, by using the camera function of the mobile phone.

Note that in FIG. 2, the illustration of a network between each HNB and the HMS or HNB-GW is omitted to clarify the procedure for transmitting data, but the communication between each HNB and the HMS or HNB-GW is conducted via the network, as a matter of course.

(Exemplary Message Signals Related to this Exemplary Embodiment)

FIG. 2 shows a part of message signals between functional elements related to this exemplary embodiment, as well as arrows indicating the directions of the message signals.

(Messages for Setting Notification Destination)

Reference numeral 108 denotes a message signal which is sent from the HMS 104 to the HNB 102 to set the OMA-DM server 106 as a notification destination when the change in camping of the UE 103 is detected, in accordance with a SET PARAMETER VALUES instruction which is compliant with TR-069. In the following example shown in FIG. 7, the signal 108 is transmitted as a part of CN Level Parameters defined in 3GPP TS25.467. In the example shown in FIG. 8, the signal 108 is transmitted as a part of HNB Access Network Related Parameter Types defined in 3GPP TS32.582. An example shown in FIG. 9 illustrates the signal 108 as a part of parameters defined in the TR-196. In the following sequence shown in FIG. 15, the signal 108 is referred to as Case 1.

Among the parameters of the standard protocol, reference numeral 109 denotes a message signal which is sent from an HNB-GW 105 to the HNB 101 to set the OMA-DM server 106 as a notification destination when the change in camping of the UE 103 is detected. In the following example shown in FIG. 11, the signal 109 is transmitted as a part of HUB REGISTER ACCEPT defined in 3GPP 525.469. In the following sequence shown in FIG. 15, the signal 109 is referred to as Case 2.

(Messages for Notifying Change in Camping)

Reference numeral 110 denotes a message signal which is sent from the HNB 102 to the HMS 104 in accordance with an INFORM instruction, which is compliant with TR-069, so as to transmit, to the OMA-DM server 106, a notification indicating the detection of the change in camping of the UE 103, when the change in camping of the UE 103 is detected. Reference numeral 111 denotes a message signal which is sent from the HMS 104 to the OMA-DM server 106 by the HTTP so as to transmit the notification which has been received from the HNB 102 and which indicates the change in camping of the UE 103. Reference numeral 112 denotes a message signal which is directly sent from the HNB 101 to the OMA-DM server 106 by the HTTP so as to transmit the notification indicating the detection of the change in camping of the UE 103, when the change in camping of the UE 103 is detected. In the following sequence shown in FIG. 16, the notification transmitted by the signals 110 and 111 is referred to as Case 1, and the notification transmitted by the signal 112 is referred to as Case 2.

<Configuration Examples of HNBs 101 and 102>

Figure 3:
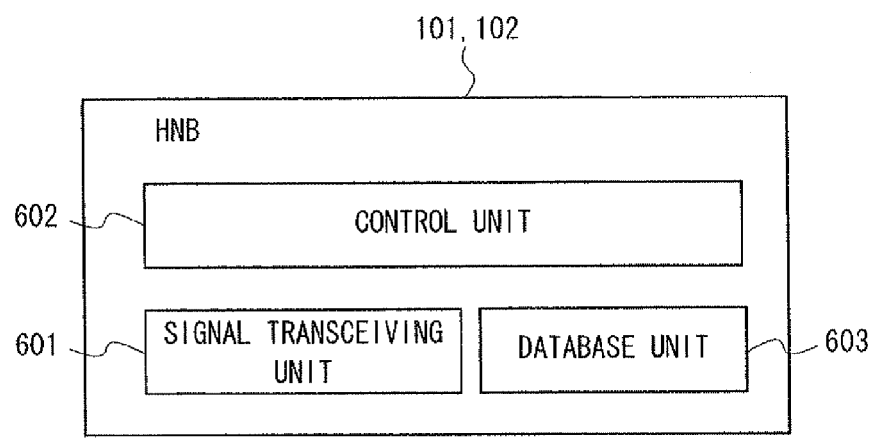
FIG. 3 is a block diagram showing a configuration example of HNBs shown in FIG. 2.

As shown in FIG. 3, each of the HNBs 101 and 102 includes a signal transceiving unit 601 that transmits and receives signals of TR-069/SOAP/HTTP, HNBAP (HNB Application Part), RUA (RANAP (Radio Access Network Application Part) User Application) protocols, for example, to and from other devices (HMS, OMA-DM server, HNB-GW, etc.). Each of the HNBs 101 and 102 also includes a control unit 602 that monitors the target IMSI on the data model and determines to send a notification to the HNB-GW 105 or the HMS 104. Each of the HNBs 101 and 102 also includes a database unit 603 for each of the HNBs 101 and 102 to manage the mobility of the UE 103, for example. In this case, the functions of each element of the HNBs 101 and 102 may be implemented by hardware, or may be implemented by software which is achieved by causing a CPU (Central Processing Unit) to execute a program using a memory.

(Configuration Example of Database Unit 603)

Figure 4:
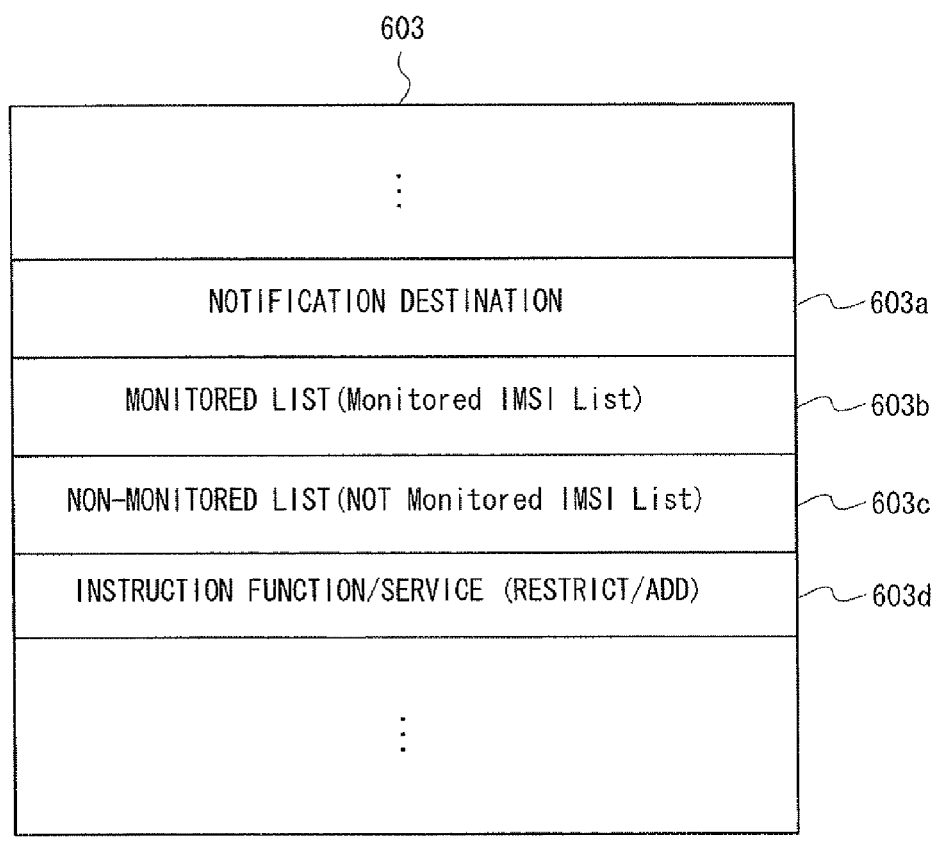
FIG. 4 is a diagram showing a configuration example of a database unit 603 shown in FIG. 3.

FIG. 4 is a diagram showing a configuration example of the database unit 603 shown in FIG. 3. Herein, only data necessary for implementing characteristic portions of this exemplary embodiment is illustrated, and the illustration of other data related to the control over the user equipment is omitted.

Reference symbol 603*a* denotes an area that stores the notification destination which is set by the received message and which indicates the change in camping, when the change in camping is detected. Reference symbol 603*b* denotes an area that stores a monitored list (Monitored IMSI List) which is set by the received message and which is a list of user equipments to be monitored by the HNBs 101 and 102. Reference symbol 603*c* denotes an area that stores a non-monitored list (NOT Monitored IMSI List) which is set by the message received as monitoring information and which is a list of user equipments that need not be monitored by the HNBs 101 and 102. Reference symbol 603*d* denotes an area that stores histories indicating that the HNBs 101 and 102 have instructed the OMA-DM server 106 to restrict or add the functions of each user equipment and have instructed other service servers to restrict or add services.

(Exemplary Processing Procedure of HNBs 101 and 102)

Figure 5A:
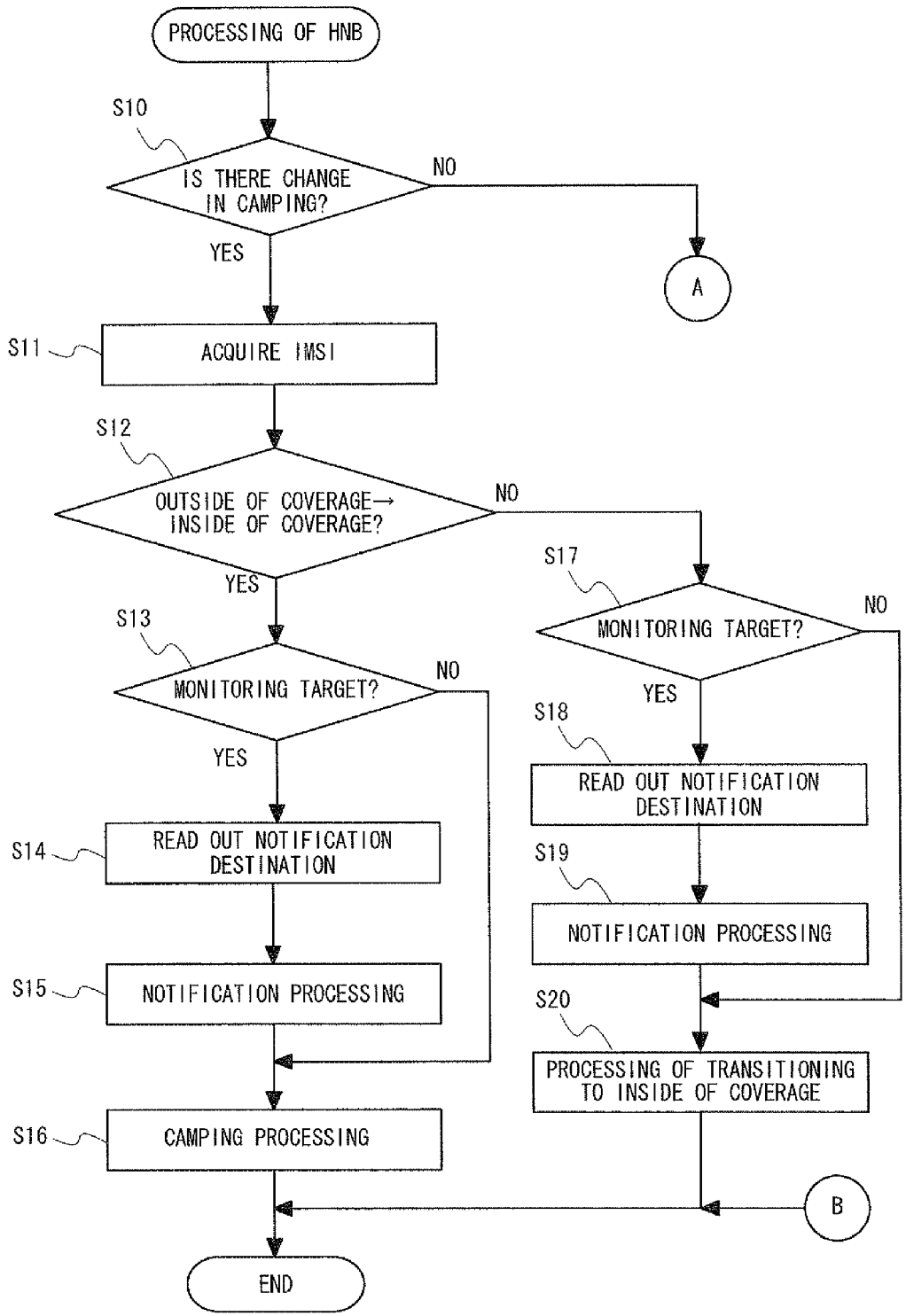
FIG. 5A is a flowchart showing an exemplary processing procedure in the HNB.
Figure 5B:
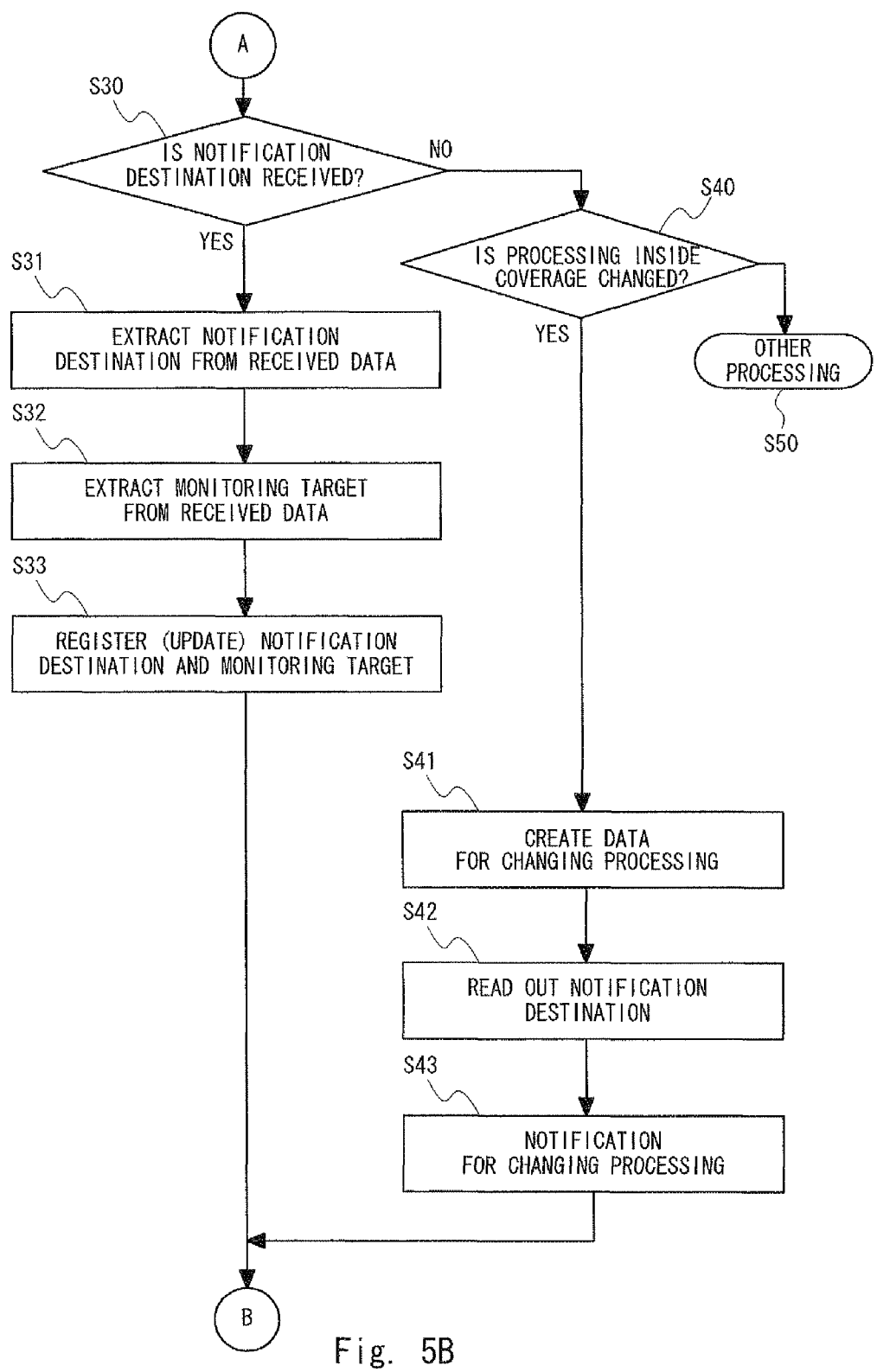
FIG. 5B is a flowchart showing an exemplary processing procedure in the HNB.

FIGS. 5A and 5B are flowcharts each showing an exemplary processing procedure of the HNBs 101 and 102. Also in these flowcharts, only the relevant portions for implementing the characteristic portions of this exemplary embodiment are illustrated, as described above.

First, in step S10, the HNB determines whether a change in camping of any one of the user equipments on the coverage has been detected or not. If the change in camping has not been detected, the HNB proceeds to step S30.

(Processing Procedure for Change in Camping)

Upon detection of the change in camping, the HNB proceeds to step S11 and acquires an identifier (IMSI) of a subscriber that owns the user equipment, the camping of which on the coverage has been changed. In step S12, the HNB determines whether the change in camping is a change from the outside of the coverage to the inside of the coverage, or a change from the inside of the coverage to the outside of the coverage. When the change in camping is a change from the outside of the coverage to the inside of the coverage, the HNB proceeds to step S13 and determines whether the user equipment, the camping of which on the coverage has been changed, is a monitoring target or not in accordance with the monitored list 603*b* and/or the non-monitored list 603*c*. When the user equipment, the camping of which on the coverage has been changed, is determined as the monitoring target, the HNB reads out the notification destination 603*a* in step S14, and performs processing of notification from the HNB to the OMA-DM server 106 in step S15.

The notification message includes the identifier (IMSI) of the subscriber that owns the user equipment, the camping of which on the coverage has been changed, the identifier (cell ID) for identifying the femtocell controlled by the HNB, and if necessary, CSG_ID (Closed Subscriber Group ID) for identifying a group to which the subscriber belongs. Then, in step S16, the HNB performs normal camping processing which is not described herein in detail. Although it is illustrated that the camping processing is directly performed in step S16 when the user equipment is not the monitoring target, an RUA CONNECT procedure to the HNB-GW 105, for example, is performed as shown in the sequence diagram of FIG. 16. In FIG. 5A, however, such a procedure is omitted to avoid complication.

On the other hand, when the change in camping is determined as a change from the inside of the coverage to the outside of the coverage in step S12, the HNB determines whether the user equipment, the camping of which on the coverage has been changed, is a monitoring target or not in step S17 in accordance with the monitored list 603*b* and/or the non-monitored list 603*c*. When the user equipment, the camping of which on the coverage has been changed, is determined as the monitoring target, the HNB reads out the notification destination 603*a* in step S18, and performs processing of notification from the HNB to the OMA-DM server 106 in step S19 in the same manner as in step S15. Then, in step S20, the HNB performs normal processing of transitioning to the outside of the coverage, which is not described herein in detail. Although it is illustrated that the processing of transitioning to the outside of the coverage is directly performed in step S20 when the user equipment is not the monitoring target, the RUA CONNECT procedure to the HNB-GW 105, for example, is performed as shown in the sequence diagram of FIG. 16. In FIG. 5A, however, such a procedure is omitted to avoid complication.

(Processing for Receiving Notification Destination)

In step S30, the HNB determines whether each message including the notification destination has been received or not. Note that processing for messages including no communication destination is omitted. Upon receiving the communication destination, the HNB proceeds to step S31 and extracts the notification destination from the received data included in the message. Next, in step S32, the HNB extracts information on a monitoring target (non-monitoring target) if it is designated in the message. In step S33, the HNB registers or updates the extracted notification destination and information on the monitoring target (non-monitoring target) in the areas represented by 603*a* to 603*c* in FIG. 4.

(Processing for Changing Processing Inside Coverage)

In step S40, the HNB determines whether there is an instruction from the HNB for the OMA-DM server 106 to change the user equipment functions, or to change (limit, add, delete, etc.) services of other service servers. When it is determined that there is the instruction, the HNB proceeds to step S41 and creates data for change. When the counterpart is the OMA-DM server 106, the HNB creates the subsequent message. This message includes the identifier (cell ID) for identifying the femtocell controlled by the HNB, and if necessary, the CSG_ID for identifying the group to which the subscriber belongs, the IMSI to be processed, and an action which will be described later with reference to FIG. 13. In step S42, the HNB reads out the notification destination from the area 603*a* shown in FIG. 4, and transmits the message created in step S43 to the read notification destination.

In the case of processing other than the above-mentioned processings, the HNB carries out other processing in step S50.

<Configuration Example of HMS 104>

Figure 6:
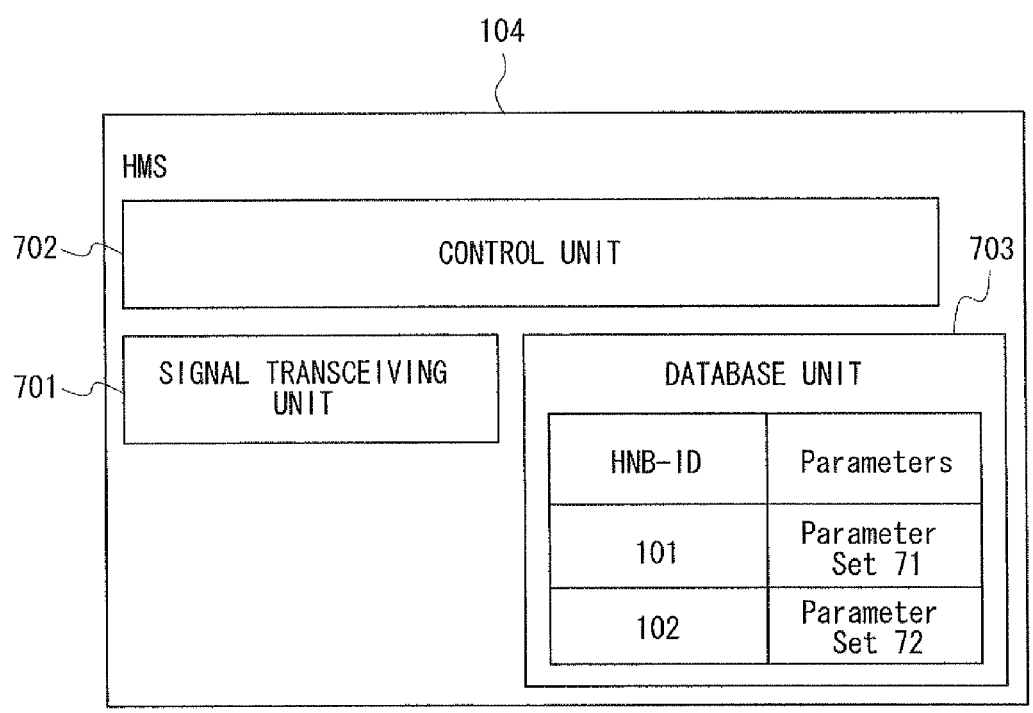
FIG. 6 is a block diagram showing a configuration example of an HMS shown in FIG. 2.

As shown in FIG. 6, the HMS 104 includes a signal transceiving unit 701 that transmits and receives signals such as SOAP/HTTP to and from other devices (HNB, OMA-DM server, and the like). The HMS 104 also includes a control unit 702 for adding or deleting objects and setting parameters, including the objects/parameters shown in FIG. 9, for example, with respect to the HNBs 101 and 102. The HMS 104 also includes a database unit 703 for managing data for each of the HNBs 101 and 102. Note that the functions of each element of the HMS 104 may be implemented by hardware, or may be implemented by software which is achieved by causing a CPU to execute a program.

The database unit 703 stores parameters shown in FIGS. 7 to 9, which are transmitted using the standard protocols for controlling each femtocell, so as to respectively correspond to the HNBs 101 and 102 that are maintained and managed by the HMS 104. In the database unit 703 shown in FIG. 6, Parameter Set 71 for the HNB 101 and Parameter Set 72 for the HNB 102 are illustrated by way of example. Note that it is not necessary to store all the parameters corresponding to the number of HNBs. Shared parameters and parameters depending on each HNB including the notification destination of the change in camping according to this exemplary embodiment may be stored separately.

(Example of Data for Setting Notification Destination by HMS 104)

In this exemplary embodiment, (1) the monitored IMSI or non-monitored IMSI shown in FIGS. 7, 8, and 9 is added to the TR-196 that is used in the interface between the HMS and the HNB; and (2) the hostname (FQDN format) and/or IP address information of the notification destination shown in FIGS. 7, 8, and 9 is added to the TR-196 that is used in the interface between the HMS and the HNB. Note that in FIGS. 7 to 9, the addition of the above-mentioned monitored IMSI or non-monitored IMSI, and the addition of the hostname (FQDN format) and IP address information of the notification destination are enclosed by a heavy line.

(Example 1: Example of CN Level Parameters)

As shown in FIG. 7, the Monitored IMSI List and Destination Information for mobility related notification parameters are added to the CN Level Parameters.

(Example 2: Example of HNB Access Network Related Parameter Types)

As shown in FIG. 8, the Monitored IMSI List and Destination Information for mobility related notification parameters are added to the HNB Access Network Related Parameter Types.

(Example 3: Example represented by TR-196 parameters)

As shown in FIG. 9, in the femto data model, objects and parameters of FAP Service.{i}.PresenceMgmt. and FAPService.{i}.PresenceMgmt.MemberDetail.{i}. are newly added. However, these are illustrated by way of example only and may be added to the existing objects or parameters.

While it is possible to designate the monitored IMSI, all IMSIs can be set as monitored IMSIs in the manner as described below.

1. Though the object of FAPService.{i}.PresenceMgmt is present, neither the Not Monitored List nor the Monitored List is set to thereby set all IMSIs as monitoring targets.

2. The Monitored List is not set and only the Not monitored List is set, to thereby set UEs other than a specific IMSI as monitoring targets.

3. The Monitored List is set and the Not monitored List is not set. This enables setting of the IP address or hostname of the notification destination for each monitored IMSI in the object of FAPService.{i}.PresenceMgmt.MemberDetail{i}. in which a UE of a specific IMSI is to be monitored.

Further, the notification destination of the change in camping according to this exemplary embodiment may be added to parameters of other groups. A transmission protocol, a method and the like for notification may also be added.

<A Configuration Example of the HNB-GW 105>

Figure 10:
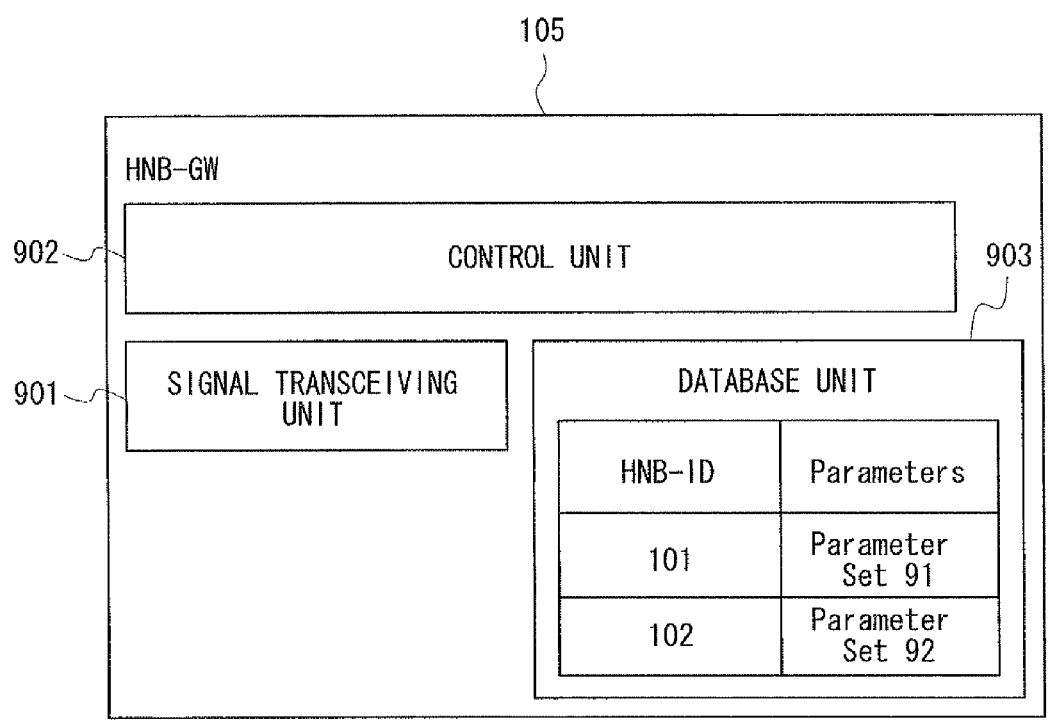
FIG. 10 is a block diagram showing a configuration example of an HNB-GW shown in FIG. 2.

As shown in FIG. 10, the HNB-GW 105 includes a signal transceiving unit 901 that transmits and receives signals such as SOAP/HTTP, HNBAP, RUA, or RANAP protocol to and from other devices (UE, HNB, HMS, OMA-DM server etc.). The HNB-GW 105 also includes a control unit 902 that controls routing of signals from the HNB to other functional elements. The HNB-GW 105 also includes a database unit 903 that stores location management information on the UE 103 and the like. As a substitute for the HMS 104, the HNB-GW 105 may notify the HNBs 101 and 102 of the monitored IMSI information and notification destination information. In this case, HNBAP (3GPP TS25.469), RUA (3GPP TS25.468), or RANAP (3GPP TS25.413) protocol is used. Note that the functions of the elements of the HNB-GW 105 may be implemented by hardware, or may be implemented by software which is achieved by causing a CPU to execute a program.

The database unit 903 stores parameters shown in FIG. 11 which are transmitted using the standard protocols for controlling each femtocell, so as to respectively correspond to the HNBs 101 and 102 to be connected. In the database unit 903 shown in FIG. 10, Parameter Set 91 for the HNB 101 and Parameter Set 92 for the HNB 102 are illustrated by way of example. Note that all parameters corresponding to the number of HNBs are not necessarily stored, and shared parameters and parameters depending on each HNB including the notification destination of the change in camping according to this exemplary embodiment may be stored separately.

(Example of Data for Setting Notification Destination by HNB-GW 105)

(Example 1: Example of HNB REGISTER ACCEPT)

FIG. 11 shows the case of an addition to an HNBAP HNB REGISTER ACCEPT message. In this case, the following rules are applied.

1. The Monitored List is not set and the IMSIs of the Not monitored List are not set, to thereby set all UEs as monitoring targets.

2. The Monitored List is not set and the IMSIs of the Not monitored List are set, to thereby set the UEs other than a specific IMSI as the monitoring targets.

3. The Monitored List is set and the Not monitored List is not set. This enables setting of a UE of a specific IMSI as a monitoring target. Additionally, in the case where a UE of a specific IMSI is set as a monitoring target, the IP address or hostname of the notification destination can be set for each IMSI. Other messages in HNBAP, RUA protocol, and RANAP protocol may also be used. In this case, when the UE of the monitored IMSI camps on the HNB or moves away from the HNB, the HNB directly notifies it to a server designated by Destination IP Address or Destination Hostname, or an IP-compatible device.

<Configuration Example of OMA-DM Server 106>

Figure 12:
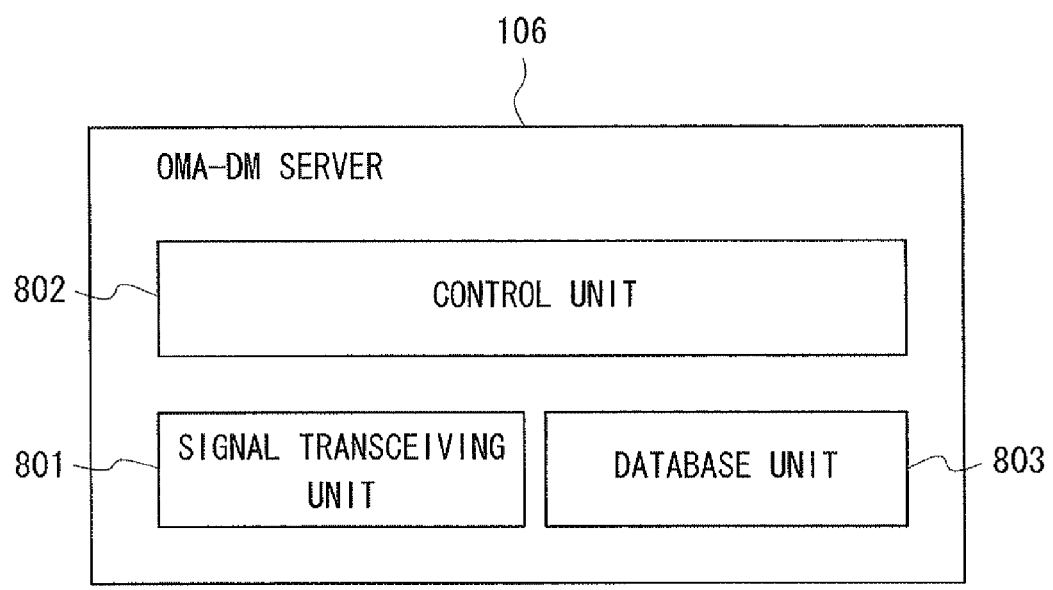
FIG. 12 is a block diagram showing a configuration example of an OMA-DM server shown in FIG. 2.

As shown in FIG. 12, the OMA-DM server 106 includes a signal transceiving unit 801 that transmits and receives signals such as SOAP/HTTP to and from other devices (UE, HNB, HNB-GW, HMS, or the like). The OMA-DM server 106 also includes a control unit 802 that allows access from the owner of the HNB to accept setting and change of device control contents, and performs processing and the like. The OMA-DM server 106 also includes a database unit 803 that defines actions to be executed on an event from the HNB, HMS or HNB-GW, which indicates that a UE enters the coverage of the HNB or that a UE moves apart from the coverage of the HNB. Note that the functions of the elements of the OMA-DM server 106 may be implemented by hardware, or may be implemented by software which is achieved by causing a CPU to execute a program.

(Configuration Example of Database Unit 803)

FIG. 13 shows an example of the database unit 803. FIG. 13 shows an example of setting policies at the side of the OMA-DM server 106. For example, the first line in FIG. 13 indicates the case of the HNB (cell ID is 1000 and CSG ID is 10000) which is installed in a bookstore. In the case where the IMSIs other than that of a salesperson (#A) are monitored, when a UE other than that of the salesperson (#A) camps on the HNB in the bookstore, the OMA-DM server 106 deactivates the camera function of the notified UE. Further, when the UE other than that of the salesperson (#A) moves away from the HNB, the HNB notifies the OMA-DM server 106 that the UE moves away from the HNB, thereby activating the camera function to be resumed. In the second and subsequent lines, the restriction of the functions of the user equipment is registered in a manner linked to the cell IDs of femtocells in consideration of CSG_ID and IMSI.

Note that FIG. 13 shows only the restriction of the functions, but addition and deletion of functions can also be included. As described below, changing registration of actions includes addition and deletion.

(Exemplary Processing Procedure of OMA-DM Server 106)

Figure 14:
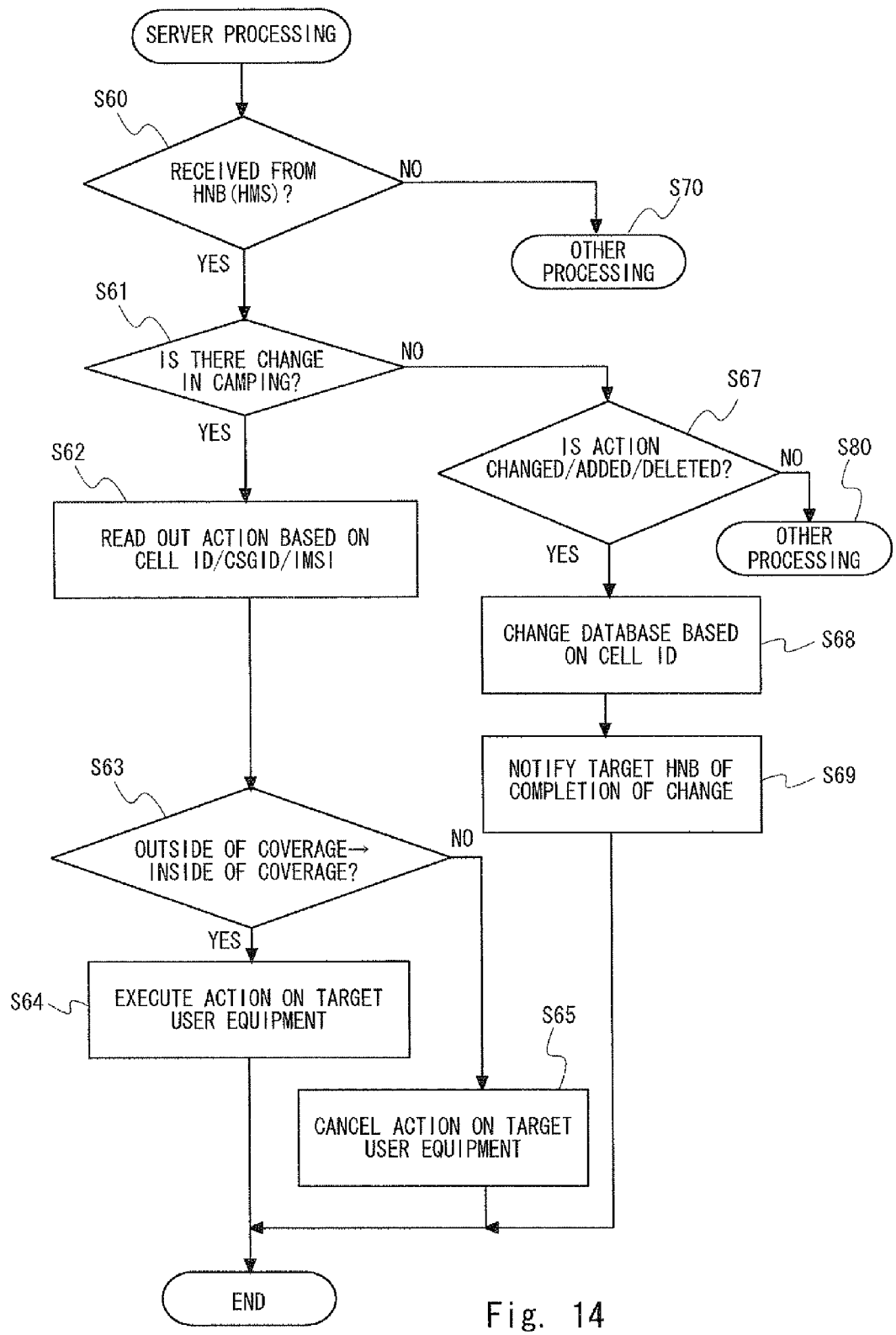
FIG. 14 is a flowchart showing an exemplary processing procedure in the OMA-DM server.

FIG. 14 is a flowchart showing an exemplary processing procedure of the OMA-DM server 106. Note that FIG. 14 shows only the portions related to this exemplary embodiment, and conventional processing and the like are omitted.

First, in step S60, the OMA-DM server 106 determines whether a message from the HNB or HMS has been received or not. If the message has not been received, the OMA-DM server 106 carries out other processing in step S70. If the message has been received, the OMA-DM server 106 proceeds to step S61 and determines whether the message is a notification as to a change in camping.

(Processing for Change in Camping)

When the message is the notification as to the change in camping, the OMA-DM server 106 proceeds to step S62, and reads out an action from FIG. 13 based on the above-mentioned cell ID, and if necessary, CSG_ID and the IMSI to be processed. Next, in step S63, the OMA-DM server 106 determines whether the change in camping is a change from the outside of the coverage to the inside of the coverage. When the change is a change from the outside of the coverage to the inside of the coverage, the OMA-DM server 106 proceeds to step S64 and executes an action on the target user equipment whose camping on the coverage has been changed. The execution of such an action is well known, so the detailed description thereof is omitted. When the change is a change from the inside of the coverage to the outside of the coverage, the OMA-DM server 106 proceeds to step S65 and cancels the action executed on the target user equipment whose camping on the coverage has been changed.

(Change of Processing)

In step S67, the OMA-DM server 106 determines whether the received message indicates a change (including addition and deletion) of the action. When the message does not indicate the change of the action, the OMA-DM server 106 performs other processing in step S80. When the message indicates the change of the action, the OMA-DM server 106 proceeds to step S68 and changes the database corresponding to the cell ID of the femtocell. The received message includes the CSG_ID and the IMSI to be processed, if necessary. Next, in step S69, the OMA-DM server 106 notifies the HNB, which has instructed the change, of completion of the change.

In this manner, the OMA-DM server 106 has a mechanism in which the cell ID of the HNB is determined to prepare a database for executing an appropriate action, which can be easily changed by the owner of the HNB or the like by accessing the Internet or the like.

<Sequence Example in Communication System According to Second Exemplary Embodiment>

An actual operation sequence will be described with reference to FIGS. 15 and 16. In this example, assume that the HMS 104 preliminarily notifies the HNB 101 of the monitored IMSI list of the HNB and the notification destination parameter which are defined in FIG. 9. The same holds true for the HNB 102.

(Exemplary Sequence of Setting Notification Designation of Change in Camping)

Figure 15:
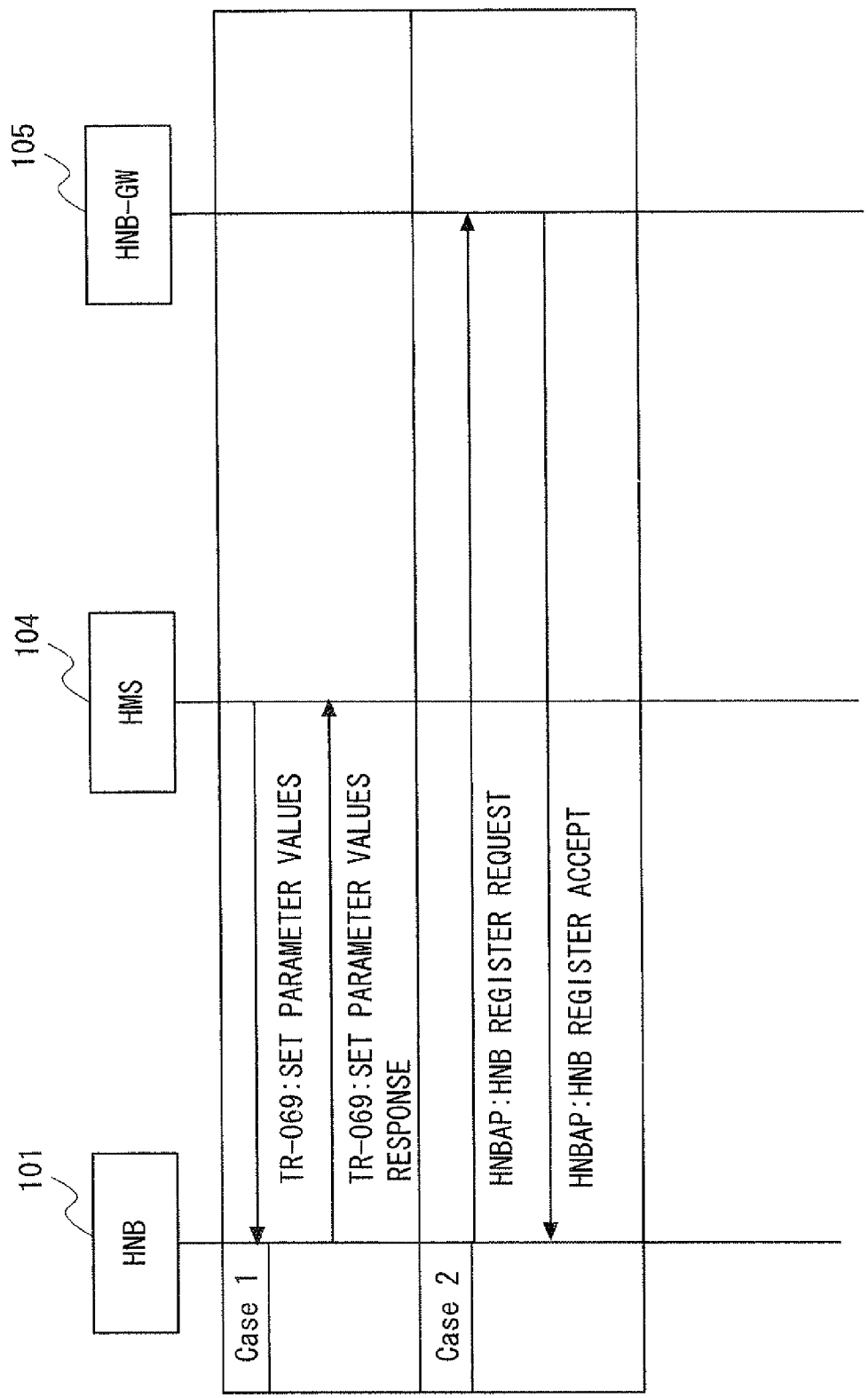
FIG. 15 is a sequence diagram showing an example of a destination setting sequence in the communication system according to the second exemplary embodiment.
Figure 16:
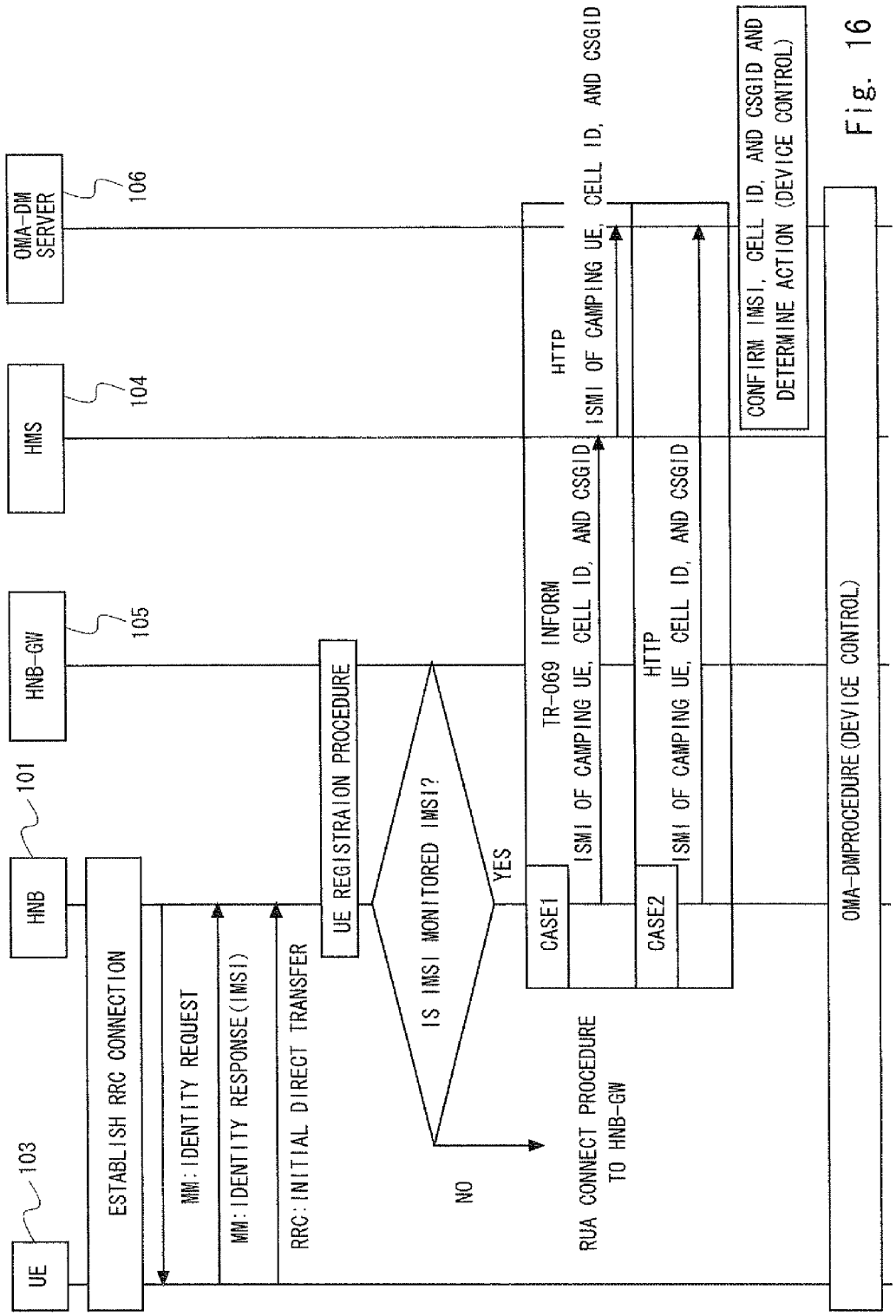
FIG. 16 is a sequence diagram showing an example of a change-in-camping notification sequence in the communication system according to the second exemplary embodiment.

FIG. 15 shows two types of cases, i.e., Case 1 and Case 2, as setting methods.

In Case 1 of FIG. 15, the monitoring target list (IMSI list) of the HNB 101 and the parameter of the notification destination are set by the HMS 104. This setting is carried out using FAPService.{i}.PresenceMgmt. and FAPService.{i}.PresenceMgmt.MemberDetail.{i}. by TR-069: SET PARAMETER VALUES method.

In Case 2 shown in FIG. 15, when the HNB 101 performs registration in the HNB-GW 105, the HNB 101 is notified of the HNB REGISTER ACCEPT message shown in FIG. 11.

(Example of Notification Sequence for Notifying Change in Camping)

Next, a description is given of a case where the UE 103 moves under the control of the HNB 101 and the HNB 101 notifies it to the OMA-DM server 106. FIG. 16 shows two types of cases, i.e., Case 1 and Case 2, as methods for notification. As described in TS25.467, when the UE 103 moves under the control of the HNB 101, the UE 103 establishes an RRC connection with the HNB 101. The HNB 101 activates an IDENTITY REQUEST procedure to identify the IMSI of the UE 103. After that, the HNB 101 activates HNBAP: UE REGISTER procedure (3GPP TS25.469) for the HNB-GW 105 to regulate the access of the UE 103 and perform registration in the HNB-GW 105. After completion of the registration in the HNB-GW 105, the HNB 101 confirms whether the IMSI of the UE 103 is the IMSI to be monitored. When the IMSI of the UE 103 is not the IMSI to be monitored, the HNB 101 activates RUA: CONNECT procedure to transmit the message received from the UE 103 to a CN 107. When the IMSI of the UE 103 is the IMSI to be monitored, the HNB 101 sends a notification indicating that the UE 103 camps on the coverage to the designated IP address or hostname preliminarily notified.

In Case 1 as the notification method, when the designated IP address or hostname preliminarily notified indicates HMS, the HNB 101 activates a TR-069 INFORM method to the HMS 104. Then, the HNB 101 notifies the IMSI of the UE 103 and the cell ID and CSG ID of the HNB 101. The HMS 104 further notifies the OMA-DM server 106 of the IMSI of the UE 103 and the cell ID and CSG ID of the HNB by using a POST method, a GET method, or the like in the HTTP protocol. Not only HTTP, but also SOAP and other protocols such as SIP may be used between the HMS 104 and the OMA-DM server 106.

Case 2 is a case where the designated IP address or hostname preliminarily notified to the HNB 101 indicates the OMA-DM server 106. The HNB 101 notifies the IMSI of the UE 103 and the cell ID and CSG ID of the HNB 101 by using the POST method, GET method, or the like in the HTTP protocol. Not only HTTP, but also SOAP and other protocols such as SIP may be used between the HNB 101 and the OMA-DM server 106.

As another case, when the UE is the one to be monitored upon receiving the UE REGISTER procedure, the HNB-GW 105 may notify the OMA-DM server 106 of the IMSI of the UE and the cell ID and CSG ID of the HNB. In the OMA-DM server 106, an action to be executed is determined based on information in the database by using the IMSI of the UE and the cell ID and CSG ID of the HNB as keys.

Third Exemplary Embodiment

A third exemplary embodiment illustrates an example of a communication system in which the configuration of the communication system according to the second exemplary embodiment is applied to LTE (Long Term Evolution). Thus, the description of the second exemplary embodiment can be referred to concerning almost all processings other than the contents described below. Accordingly, the repeated description of elements and processing is omitted.

<Configuration Example of Communication System According to Third Exemplary Embodiment>

Figure 17:
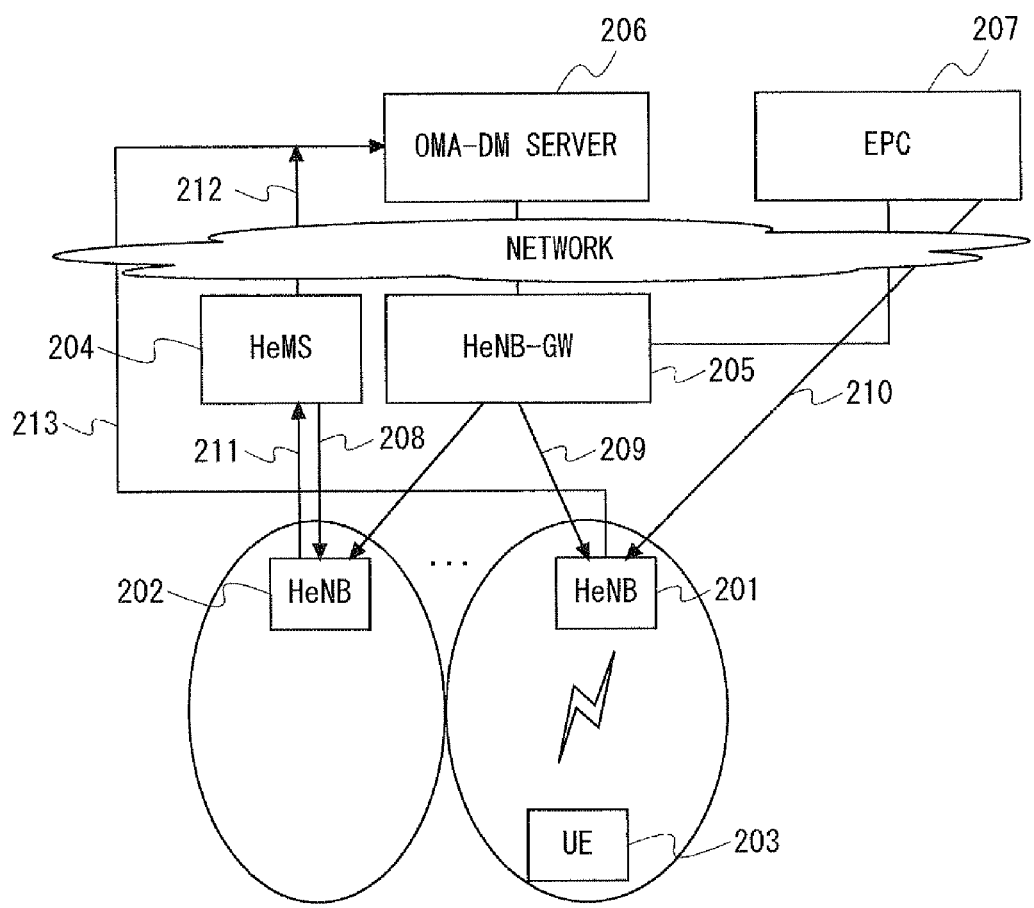
FIG. 17 is a block diagram showing a configuration example of a communication system according to a third exemplary embodiment of the present invention.

FIG. 17 shows that an HeNB (Home evolved NodeB) 201 is a small-size base station compliant with a radio system (OFDMA) defined by LTE (Long Term Evolution). An HeMS (Home eNodeB Management System) 104 is a maintenance management server for controlling the HeNB 201. The HeNB 201 is connected to an HeNB-GW (Home eNodeB Gateway) and communicates with an EPC (Evolved Packet Core) 207 via the HeNB-GW. Note that the HeNB-GW 205 is optional in the 3GPP standardization (TS36.300). Accordingly, communication can be directly conducted between the HeNB and the CN by an S1AP (S1 Application Part) protocol (TS36.413) or the like without involving the HeNB-GW 205.

Referring to FIG. 17, the HeMS 204 uses TR-069 protocol to provide monitored mobile terminal information (UE information monitored by HNB), which is introduced in this exemplary embodiment, to the HeNB 201 and an HeNB 202. On the basis of the monitored mobile terminal information, the HeNBs 201 and 202 monitor a UE 203 that moves into coverage of each HeNB, or moves away from the coverage. The HeNBs 201 and 202 confirm the monitored mobile terminal information when the UE 203 moves into the coverage of the HeNBs 201 and 202, or moves away from the coverage of the HeNBs 201 and 202. When the IMSI of the UE 203 is included in the monitored mobile terminal information, the HeNBs 201 and 202 perform notification to the OMA-DM server 206 which is designated by the hostname (FQDN format) or IP address in the monitored mobile terminal information. The OMA-DM server 206 identifies the HeNBs 201 and 202 by using cell IDs or the like, and activates the OMA-DM protocol for the UE 203 in accordance with the action defined as shown in FIG. 13, for example, thereby performing an appropriate device control.

(Exemplary Message Signals Related to this Exemplary Embodiment)

FIG. 17 shows a part of message signals (transmit data) between functional elements related to this exemplary embodiment, as well as arrows indicating the directions of the message signals.

(Messages for Setting Notification Destination)

Reference numeral 208 denotes a message signal which is sent from the HeMS 204 to the HeNB 202 to set the OMA-DM server 206 as a notification destination when the change in camping of the UE 203 on the coverage is detected, in accordance with a SET PARAMETER VALUES instruction compliant with TR-069. The signal 208 is similar to that described in FIGS. 7 to 9 described above. In the sequence shown in FIG. 19 described below, the signal 208 is referred to as Case 1.

Among parameters in the standard protocol, reference numeral 209 denotes a message signal which is sent from the HeNB-GW 205 to the HeNBs 201 and 202 to set the OMA-DM server 206 as a notification destination when the change in camping of the UE 203 on the coverage is detected. As shown in the example of FIG. 18 described below, the signal 209 is an S1AP (3GPP TS36.413) S1 SETUP RESPONSE message. In the sequence shown in FIG. 19 described below, the signal 209 is referred to as Case 2.

Reference numeral 210 denotes an S1AP (3GPP TS36.413) S1 SETUP RESPONSE message which is directly transmitted from the EPC 207 to the HeNB 202 when the HeNB-GW 205 is not present. In the sequence shown in FIG. 19 described below, the signal 210 is referred to as Case 3.

(Messages for Notifying Change in Camping)

Reference numeral 211 denotes a message signal which is sent from the HeNB 202 to the HeMS 204 in accordance with an INFORM instruction compliant with TR-069, so as to transmit, to the OMA-DM server 206, a notification indicating the detection of the change in camping of the UE 103 on the coverage, when the change in camping of the UE 103 on the coverage is detected. Reference numeral 212 denotes a message signal for the HeMS 204 to transmit the notification, which indicates the change in camping of the UE 203 on the coverage and which has been received from the HeNB 202, to the OMA-DM server 206 by HTTP. Reference numeral 213 denotes a message signal for the HeNB 201 to directly transmit, to the OMA-DM server 206 by HTTP, the notification when the change in camping of the UE 203 on the coverage is detected. In the sequence shown in FIG. 20 described below, the notifications by the signals 211 and 212 are referred to as Case 1, and the notification by the signal 213 is referred to as Case 2.

<Configuration Examples of Each Element>

The roles of the basic elements according to the third exemplary embodiment and the formats of transmission parameters are basically similar to those of the second exemplary embodiment. Accordingly, the repeated explanation thereof is omitted, and differences from the second exemplary embodiment will be described below.

(Examples of data for setting notification destination by HeNB-GW 205 or EPC)

(Example 1: Example of S1 SETUP RESPONSE)

FIG. 18 shows the case of an addition to the S1AP (3GPP TS36.413) S1 SETUP RESPONSE message. The method of using parameters is similar to the HNBAP protocol shown in FIG. 11 in the second exemplary embodiment.

<Exemplary Sequence in Communication System According to Third Exemplary Embodiment>

Figure 19:
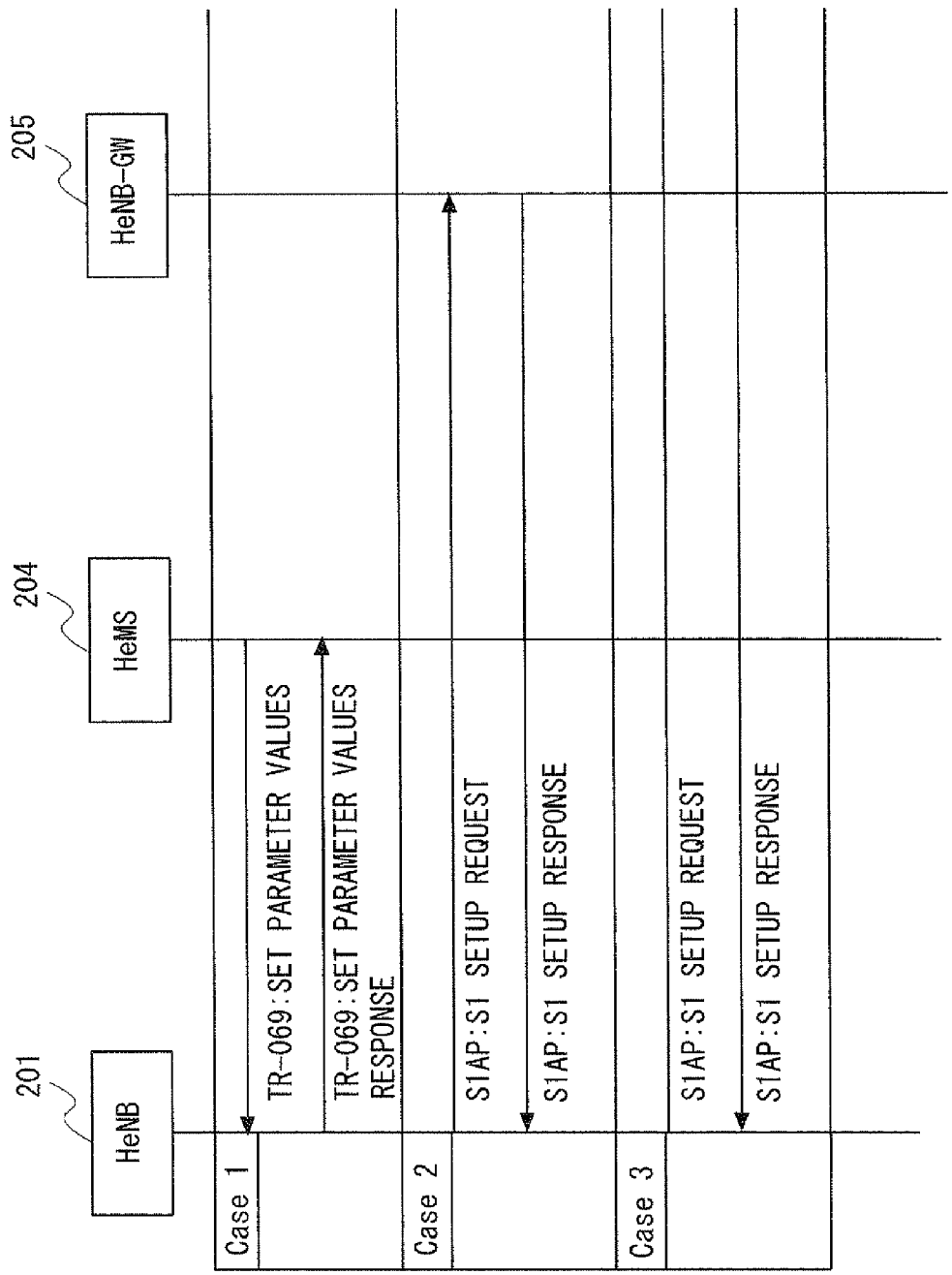
FIG. 19 is a sequence diagram showing an example of a destination setting sequence in the communication system according to the third exemplary embodiment.

FIG. 19 shows a procedure for setting the UE information of the monitoring target and the notification destination parameter in the case of LTE. The HeMS 204 preliminarily notifies the HeNB 201 of the monitored IMSI list of the HeNB and the notification destination parameter, which are defined in the same manner as in FIG. 9. The same holds true for the HeNB 202.

(Exemplary Sequence of Setting Notification Destination of Change in Camping)

FIG. 19 shows three types of cases, i.e., Case 1 to Case 3 as methods for setting the notification destination of the change in camping.

In Case 1 shown in FIG. 19, the monitored IMSI list of the HeNB 201 and the notification destination parameter are set. This setting is carried out using FAPService.{i}.PresenceMgmt. and FAPService.{i}.PresenceMgmt.MemberDetail.{i} by TR-069: SET PARAMETER VALUES method.

In Case 2, when the HeNB 201 performs registration in the HeNB-GW 205, the HeNB 201 is notified of the S1AP: S1 SETUP RESPONSE message shown in FIG. 18.

Case 3 is a case where the HeNB-GW 205 is not present and an MME (EPC 207 in FIG. 17) directly notifies the HeNB 201 of the S1 SETUP RESPONSE message.

(Example of notification sequence for notifying change in camping)

Next, a description is given of a case where the UE 203 moves under the control of the HeNB 201 and the HeNB 201 sends a notification to the OMA-DM server 206. FIG. 20 shows two types of cases, i.e., Case 1 and Case 2, as methods for notification. As described in TS25.467, the UE 203 establishes an RRC connection with the HeNB 201 when the UE 203 moves under the control of the HeNB 201. Then, the HeNB 201 activates an IDENTITY REQUEST procedure to identify the IMSI of the UE 203. The HeNB 201 confirms whether the IMSI of the UE 203 is the IMSI to be monitored. If the IMSI of the UE 203 is not the IMSI to monitored, the HeNB 201 activates an S1AP INITIAL UE MESSAGE procedure to transmit the message received from the UE 203 to the HeNB-GW 205, or an NAS (Non-Access Stratum) message to the MME (EPC). When the IMSI of the UE 203 is the IMSI to be monitored, the HeNB 201 sends a notification indicating that the UE 203 camps on in the coverage to the destination IP address or hostname preliminarily notified.

In Case 1 as the notification method, the destination IP address or hostname preliminarily notified indicates the HeMS 204. The HeNB 201 activates a TR-069 INFORM method and notifies the HeMS 204 of the IMSI of the UE and the cell ID and CSG ID of the HeNB. Further, the HeMS 204 notifies the OMA-DM server 206 of the IMSI of the UE and the cell ID and CSG ID of the HeNB by using the POST method, GET method, or the like in the HTTP protocol. Not only HTTP, but also SOAP or other protocols such as SIP (Session Initiation Protocol) may be used between the HeMS 204 and the OMA-DM server 206.

Case 2 is a case where the destination IP address or hostname preliminarily notified to the HeNB 201 indicates the OMA-DM server 206. The HeNB 201 notifies the IMSI of the UE 203 and the cell ID and CSG ID of the HeNB 201 by using the POST method, GET method, or the like in the HTTP protocol. Not only the HTTP, but also SOAP and other protocols such as SIP may be used between the HeNB 201 and the OMA-DM server 206.

As another case, the HeNB-GW 205 may identify the IMSI of the UE upon receiving the INITIAL UE MESSAGE and may notify the OMA-DM server 206 of the IMSI of the UE 203 and the cell ID and CSG ID of the HeNB. As with the case of W-CDMA, in the OMA-DM server 206, the action to be executed is determined using the information in the database shown in FIG. 13.

<Modified Example of this Exemplary Embodiment>

According to this exemplary embodiment, a small base station such as a femtocell detects the location of the UE. Accordingly, this exemplary embodiment can be applied not only 3G (FIG. 2) and LTE (FIG. 17), but also any radio access system such as Wimax, LTE-Advanced, and wireless LAN (Local Area Network). This exemplary embodiment can also be applied to radio systems other than the 3G system and the LTE system. Further, not only such a small base station but also base stations having a wider coverage and having various cell radius like a pico base station, a micro base station, a macro base station or the like can also be applied. Furthermore, small base stations are not fixed, but can also be applied to mobile base stations that can be mounted in a bus, a train, a bullet train, and the like.

For example, upon detecting that a UE camps on a macro cell stalled in a roadway, such as a highway or an ordinary road, the macro cell notifies the OMA-DM server of the detection, which enables the mode of a mobile phone to forcibly transition to a drive mode. In the case where the drive mode is set, when an incoming call is received, audio guidance is provided to inform the caller of the status. This enables suppression of incoming calls to the user, thereby achieving suppression of occurrence of accidents.

Further, when a mobile base station detects that a UE camps on the coverage in the state where the mobile base station is installed in a bullet train or a train, the mobile base station notifies the OMA-DM server of the detection. This enables the mode of a mobile phone to forcibly transition to a manner mode, thereby suppressing incoming call sound, operation sound, or the like.

In this exemplary embodiment, the OMA-DM server is notified that the UE has moved into the coverage of the HNB or has moved away from the coverage of the HNB. However, the notification destination is not limited to the OMA-DM server, but may be a presence server, an application server, or a WEB server. This enables management of the start and end of the provision of various services in the coverage, such as transmission of information and transmission of coupons, by utilizing the locality of the femtocell. Further, the notification destination may be an IP-compatible device located in a house or a company. For example, the HNB located in a living room notifies an IP-compatible device (a wireless LAN router, a television, a game machine, etc.) within a house that the UE camps on the femtocell. This allows the power supply of a television to be automatically turned on when the user carrying a mobile phone enters the living room. Alternatively, this allows the power supply of the television to be automatically turned off when the user carrying the mobile terminal moves away from the living room.

As for the policy at the side of the OMA-DM server shown in FIG. 13, the owner of the HNB performs authentication such as HTTP digest authentication with the OMA-DM server. When the authentication is OK, the owner is given an access right for arbitrarily changing the policy via a WEB interface. This allows the owner of the HNB to change the database at the side of the OMA-DM server shown in FIG. 13. FIG. 13 shows the case where the UE to be monitored camps on the HNB. However, also in the case of handover, when the UE is handed over to the HNB, the HNB confirms the IMSI of the UE. In the case of the monitored IMSI, the HNB transmits an event to the designated IP address or hostname. Similarly, when the UE to be monitored moves away from the HNB, the HNB receives no periodical location registration message from the UE, thereby enabling detection that the UE has moved away from the HNB. In this case, the HNB sends a notification indicating that the UE has moved away from the HNB, to the designated IP address or hostname. In this case, the OMA-DM server executes an action in accordance with the preliminarily designated policy within the database. Further, the HNB may periodically page the UE, for example, to confirm that the UE camps on the coverage. Similarly, when the user in communication moves away from the coverage of the HNB by handover, the HNB sends a notification indicating that the UE has moved away from the HNB, to the designated IP address or hostname, after completion of the handover. In this case, the OMA-DM server executes an action in accordance with the preliminarily designated policy within the database. The HNB may periodically page the UE, for example, to confirm that the UE camps on the coverage.

This exemplary embodiment described above has the following specific features.

1. In the 3G system, the monitored IMSI or the not-monitored IMSI and the IP address and hostname (FQDN format) as the notification destination, which are shown in FIG. 9, are added to the femto data model (Broadband TR-196) used in the interface between the HMS and the HNB.

2. In the LTE system, the monitored IMSI or the not-monitored IMSI and the IP address and hostname (FQDN format) as the notification destination, which are shown in FIG. 9, are added to the femto data model used in the interface between the HeMS and the HeNB.

3. In the 3G system, the monitored IMSI or the not-monitored IMSI and the IP address and hostname (FQDN format) as the notification destination, which are shown in FIG. 11, are added to the HNBAP protocol used in the interface between the HNB-GW and the HNB.

4. In the LTE system, the monitored IMSI or the not-monitored IMSI and the IP address and hostname (FQDN format) as the notification destination, which are shown in FIG. 18, are added to the S1AP protocol used in the interface between the HeNB-GW and the HeNB.

5. There are provided the procedure in which, as shown in FIG. 16, the HNB determines the IMSI of the UE and then sends the notification to the OMA-DM server to thereby perform the device control, and the procedure in which, as shown in FIG. 20, the HeNB determines the IMSI of the UE and then sends the notification to the OMA-DM server to thereby perform the device control.

6. An automatic device control service is carried out by a trigger of the camping on the coverage, which is obtained by the device control performed by the OMA-DM by utilizing the locality of the femtocell.

7. As shown in FIG. 13, it is possible to achieve the policy setting method in the OMA-DM server and the policy change by the owner of the HNB. Note that the above-mentioned exemplary embodiments can be applied to radio systems other than 3G/LTE, and can also be applied to cells other than a femtocell, such as a pico cell, a micro cell, and a macro cell. The cells may belong to mobile base stations. The notification destination is not limited to the OMA-DM server, but may be a WEB server, an application server, or an IP-compatible device.

With this configuration, in this exemplary embodiment, the HMS notifies the HNB of the monitored or not-monitored UE information and the hostname (FQDN format) or IP address information as the notification destination by TR-069 or HNBAP procedure. Accordingly, the HNB can recognize the monitored or not-monitored UE information and the hostname (FQDN format) or IP address information as the notification destination. Consequently, when the UE camps on the coverage under the control of the HNB, or moves away from the coverage under the control of the HNB, an event can be notified to an appropriate notification destination (the OMA-DM server, IP-compatible device, etc.).

Notifying the OMA-DM server of the camping on the femtocell enables various device controls over the UE by utilizing the locality of the femtocell. This allows the camera function to be deactivated in a bookstore, a museum, and the like, allows the mode to automatically transition to the manner mode in a movie theater, and allows the mode to automatically transition to the manner mode in a bullet train or a train, for example.

This exemplary embodiment is not limited to the radio system and the cell radius, but can also be applied to a specific macro cell. This allows the mode to automatically transition to the drive mode in a macro cell installed in a roadway such as a highway or an ordinary road.

This exemplary embodiment is not limited to the OMA-DM server, but can also be applied to a presence server, an application server, and a WEB server. This enables various services in the coverage, such as transmission of information and transmission of coupons, by utilizing the locality of the femtocell.

The notification destination may be an IP-compatible device within a house or a company. For example, the HNB located in a living room notifies an IP-compatible device (a wireless LAN router, a television, a game machine, etc.) within a house that the UE camps on the femtocell. This allows the power supply of the television to be automatically turned on when the user carrying a mobile terminal enters the living room. Alternatively, this allows the power supply of the television to be automatically turned off when the user carrying the mobile phone moves away from the living room.

The owner of the HNB is given an access right for arbitrarily changing the policy at the side of the OMA-DM server via a WEB interface after the authentication. Accordingly, the owner of the HNB can determine how to perform a device control.

Furthermore, as described above, this exemplary embodiment can be applied not only to the femto system but also to the macro cell. In the case of the macro cell, an RNC in W-CDMA or a maintenance management server of eNodeB in LTE can provide information on the monitored IMSI and the notification destination by a protocol such as CORBA (Common Object Request Broker Architecture) or SOAP.

Other Exemplary Embodiments

While the exemplary embodiments according to the present invention have been described in detail above, a system or a device obtained by arbitrarily combining respective features included in each exemplary embodiment is also included in the scope of the present invention.

The present invention may be applied to a system including a plurality of devices, or may be applied to a single device. The present invention can also be applied to the case where an information processing program that implements the functions of each exemplary embodiment is directly supplied or remotely supplied to a system or a device. Accordingly, a control program installed in a computer to cause the computer to implement the functions of the present invention, a medium storing the control program, and a WWW server that allows the control program to be downloaded are included in the scope of the present invention.

The control program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The control program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

This application is based upon and claims the benefit of priority from Japanese patent application No. 2010-189046, filed on Aug. 26, 2010, the disclosure of which is incorporated herein in its entirety by reference.

Other Expressions of Exemplary Embodiments

The whole or part of the exemplary embodiments disclosed above can be described as, but not limited to, the following supplementary notes.

(Supplementary Note 1)

A communication system including a femto base station that provides a femtocell, the communication system comprising:

notification destination setting means for setting, in the femto base station, a notification destination to be notified of a change in camping of a user equipment on the femtocell, wherein the femto base station notifies the set notification destination of the change in camping of the user equipment, upon detecting the change in camping.

(Supplementary Note 2)

The communication system according to Supplementary note 1, wherein the notification destination is included in transmission data to be transmitted to the femto base station, the transmission data being compliant with a standard protocol in the communication system that provides the femtocell.

(Supplementary Note 3)

The communication system according to Supplementary note 2, wherein the notification destination is included in one of a parameter set by a maintenance management server that manages the femto base station, a parameter set by a gateway connected to a core network, and a parameter set by a packet core via a network.

(Supplementary Note 4)

The communication system according to Supplementary note 1, wherein the notification destination setting means is configured to further set, in the femto base station, monitoring information indicating whether or not each of user equipments needs to be monitored by the femto base station, and the femto base station notifies the set notification destination of the change in camping, when the femto base station detects the change in camping of the user equipment and when the monitoring information indicates that the user equipment needs to be monitored by the femto base station.

(Supplementary Note 5)

The communication system according to any one of Supplementary notes 1 to 4, wherein the notification destination is an information processing device that can control a function of the user equipment, and the information processing device restricts or adds a function of the user equipment when the information processing device is notified of a change in the user equipment moving from an outside of coverage to an inside of the coverage, the function of the user equipment being preliminarily stored in association with at least a cell ID for identifying the femtocell controlled by the femto base station having notified the change in camping, and the information processing device cancels the restriction or addition of the function of the user equipment when the information processing device is notified of a change in the user equipment moving from the inside of the coverage to the outside of the coverage.

(Supplementary Note 6)

The communication system according to Supplementary note 5, wherein the information processing device stores the restriction or addition of the function of the user equipment in association further with IMSI for identifying a subscriber that owns the user equipment and/or CSG_ID for identifying a group to which the subscriber belongs.

(Supplementary Note 7)

The communication system according to any one of Supplementary notes 1 to 4, wherein the notification destination is an information processing device that can control provision of a service to a user, and the information processing device starts the provision of the service to the user when the information processing device is notified of a change in the user equipment moving from an outside of coverage to an inside of the coverage, the provision of the service being preliminarily stored in association with at least a cell ID for identifying the femtocell controlled by the femto base station having notified the change in camping, and terminates the provision of the service to the user when the information processing device is notified of a change in the user equipment moving from the inside of the coverage to the outside of the coverage.

(Supplementary Note 8)

The communication system according to Supplementary note 7, wherein the information processing device stores the provision of the service to the user in association further with IMSI for identifying a subscriber that owns the user equipment and/or CSG_ID for identifying a group to which the subscriber belongs.

(Supplementary Note 9)

A control method for a communication system that provides a femtocell, the control method comprising:

a notification destination setting step of setting, in the femto base station, a notification destination to be notified of a change in camping of a user equipment on the femtocell; and a change-in-camping notification step of notifying the set notification destination of the change in camping of the user equipment, upon detecting the change in camping.

(Supplementary Note 10)

An information processing device that manages a user equipment in a communication system providing a femtocell, the information processing device comprising:

storage means for storing restriction or addition of a function of the user equipment in association with at least a cell ID for identifying the femtocell;

reception means for receiving a change in camping of the user equipment on the femtocell from a femto base station having detected the change in camping, the change in camping being notified to a notification destination, the notification destination representing the information processing device and being preliminarily set in the femto base station; and management means for restricting or adding the function of the user equipment stored in the storage means upon receiving a change in the user equipment moving from an outside of coverage to an inside of the coverage, and for canceling the restriction or addition of the function of the user equipment upon receiving a change in the user equipment moving from the inside of the coverage to the outside of the coverage.

(Supplementary Note 11)

The information processing device according to Supplementary note 10, wherein the restriction or addition of the function of the user equipment is stored in association further with IMSI for identifying a subscriber that owns the user equipment and/or CSG_ID for identifying a group to which the subscriber belongs (Supplementary Note 12)

The information processing device according to Supplementary note 10 or 11, further comprising:

means for receiving, from the femto base station, an instruction to change, add, or delete the restriction or addition of the function of the user equipment stored in the storage means, wherein the restriction or addition of the function of the user equipment with respect to the femtocell controlled by the femto base station is changed, added, or deleted in the storage means based on the received instruction.

(Supplementary Note 13)

A control method for an information processing device that manages a user equipment in a communication system providing a femtocell, the control method comprising:

a reception step of receiving a change in camping of the user equipment on the femtocell from a femto base station having detected the change in camping, the change in camping being notified to a notification destination, the notification destination representing the information processing device and being preliminarily set in the femto base station; and a management step of restricting or adding a function of the user equipment stored in storage means in association with at least a cell ID for identifying the femtocell, upon receiving a change in the user equipment moving from an outside of coverage to an inside of the coverage, and of canceling the restriction or addition of the function of the user equipment, upon receiving a change in the user equipment moving from the inside of the coverage to the outside of the coverage.

(Supplementary Note 14)

A control program for an information processing device that manages a user equipment in a communication system providing a femtocell, the control program causing a computer to execute:

a reception step of receiving a change in camping of the user equipment on the femtocell from a femto base station having detected the change in camping, the change in camping being notified to a notification destination, the notification destination representing the information processing device and being preliminarily set in the femto base station; and a management step of restricting or adding a function of the user equipment stored in storage means in association with at least a cell ID for identifying the femtocell, upon receiving a change in the user equipment moving from an outside of coverage to an inside of the coverage, and canceling the restriction or addition of the function of the user equipment, upon receiving a change in the user equipment moving from the inside of the coverage to the outside of the coverage.

(Supplementary Note 15)

An information processing device that manages a service to a user in a communication system providing a femtocell, the information processing device comprising:

storage means for storing the service to the user in association with at least a cell ID for identifying the femtocell;

reception means for receiving a change in camping of the user equipment on the femtocell from a femto base station having detected the change in camping, the change in camping being notified to a notification destination, the notification destination representing the information processing device and being preliminarily set in the femto base station; and management means for starting the service to the user stored in the storage means, upon receiving a change in the user equipment moving from an outside of coverage to an inside of the coverage, and for canceling the service to the user, upon receiving a change in the user equipment moving from the inside of the coverage to the outside of the coverage.

(Supplementary Note 16)

An information transmission method of transmitting information to a femto base station that controls a femtocell, the information transmission method comprising:

transmitting, to the femto base station, a notification destination to be notified of a change in camping of a user equipment on the femtocell, as a part of transmission data compliant with a standard protocol.

(Supplementary Note 17)

A femto base station that controls a user equipment within a femtocell in a communication system providing the femtocell, the femto base station comprising:

reception means for receiving a notification destination to be notified of a change in camping of the user equipment on the femtocell; and notification means for notifying the received notification destination of the change in camping of the user equipment, upon detecting the change in camping.

(Supplementary Note 18)

The femto base station according to Supplementary note 17, wherein the notification destination is included in transmission data to be transmitted to the femto base station, the transmission data being compliant with a standard protocol in the communication system that provides the femtocell.

(Supplementary Note 19)

The femto base station according to Supplementary note 18, wherein the notification destination is included in one of a parameter set by a maintenance management server that manages the femto base station, a parameter set by a gateway connected to a core network, and a parameter set by a packet core via a network.

(Supplementary Note 20)

The femto base station according to Supplementary note 17, wherein the reception means is configured to further receive monitoring information indicating whether or not each of user equipments needs to be monitored by the femto base station, and the notification means is configured to notify the received notification destination of the change in camping, when the femto base station detects the change in camping of the user equipment and when the monitoring information indicates that the user equipment needs to be monitored by the femto base station.

(Supplementary Note 21)

The femto base station according to Supplementary note 17 or 20, further comprising:

means for transmitting, to an information processing device, an instruction to change, add, or delete restriction or addition of a function of the user equipment, when the notification destination is the information processing device that manages the user equipment.

(Supplementary Note 22)

A control method for a femto base station that controls a femtocell in a communication system providing the femtocell, the control method comprising:

a reception step of receiving a notification destination to be notified of a change in camping of a user equipment on the femtocell; and a notification step of notifying the received notification destination of the change in camping of the user equipment, upon detection of the change in camping.

(Supplementary Note 23)

A control program for a femto base station that controls a femtocell in a communication system providing the femtocell, the control program causing a computer to execute:

a reception step of receiving a notification destination to be notified of a change in camping of a user equipment on the femtocell; and a notification step of notifying the received notification destination of the change in camping of the user equipment, upon detection of the change in camping.

REFERENCE SIGNS LIST

10 FEMTO BASE STATION (HNB, HeNB)
11 CHANGE IN CAMPING
12, 603a NOTIFICATION DESTINATION
20 NOTIFICATION DESTINATION SETTING UNIT

30 USER EQUIPMENT (UE)
71, 72, 91, 92 Parameter Set
101, 102 HNB
103, 203 UE
104 HMS
105 HNB-GW
106, 206 OMA-DM SERVER
107 CN
108-112, 208, 209, 211-213 MESSAGE SIGNAL
201, 202 HeNB
204 HeMS
205 HeNB-GW
106 OMA-DM SERVER
207 EPC
210 S1 SETUP RESPONSE
601, 701, 801, 901 SIGNAL TRANSCEIVING UNIT
602, 702, 802, 902 CONTROL UNIT
603, 703, 803, 903 DATABASE UNIT
603b MONITORED LIST
603c NON-MONITORED LIST
603d HISTORY

The invention claimed is:

1. An information processing device that manages a user equipment in a communication system providing a femtocell, the information processing device comprising:
 a storage unit that stores restriction or addition of a function of the user equipment in association with at least a cell ID for identifying the femtocell;
 a reception unit that receives a change in camping of the user equipment on the femtocell from a femto base station having detected the change in camping, the change in camping being notified to a notification destination, the notification destination representing the information processing device and being preliminarily set in the femto base station;
 a management unit that restricts or adds the function of the user equipment stored in the storage unit, upon receiving a change in the user equipment moving from an outside of coverage of the femtocell to an inside of the coverage, and that cancels the restriction or addition of the function of the user equipment, upon receiving a change in the user equipment moving from the inside of the coverage to the outside of the coverage; and
 a unit that receives, from the femto base station, an instruction to change, add, or delete the restriction or addition of the function of the user equipment stored in the storage unit,
 wherein the management unit uses an OMA-DM (Open Mobile Alliance-Device Management) protocol for the restriction or addition, and the cancellation,
 wherein the restriction or addition includes at least one of: deactivating or activating a GPS (Global Positioning System) function of the user equipment; and switching a mode of the user equipment to a manner mode or a drive mode,
 wherein the restriction or addition of the function of the user equipment is stored in association further with IMSI (International Mobile Subscriber Identity) for identifying a subscriber that owns the user equipment and/or CSG ID (Closed Subscriber Group ID) for identifying a group to which the subscriber belongs,
 wherein the restriction or addition of the function of the user equipment with respect to the femtocell controlled by the femto base station is changed, added, or deleted in the storage unit based on the received instruction,
 wherein the notification destination is included in transmission data to be transmitted to the femto base station, the transmission data being compliant with a standard protocol in the communication system that provides the femtocell,
 wherein the notification destination is included in one of a parameter set by a maintenance management server that manages the femto base station, a parameter set by a gateway connected to a core network, and a parameter set by a packet core via a network,
 wherein the reception unit receives the change in camping from the femto base station, when the femto base station detects the change in camping of the user equipment and when monitoring information indicates that the user equipment needs to be monitored by the femto base station, the monitoring information being received by the femto base station and indicating whether or not the user equipment needs to be monitored by the femto base station,
 wherein the monitoring information is included in the transmission data, and
 wherein the monitoring information is included in one of the parameter set by the maintenance management server, the parameter set by the gateway, and the parameter set by the packet core.

2. An information processing device that manages a service to a user in a communication system providing a femtocell, the information processing device comprising:
 a storage unit that stores the service to the user in association with at least a cell ID for identifying the femtocell;
 a reception unit that receives a change in camping of the user equipment on the femtocell from a femto base station having detected the change in camping, the change in camping being notified to a notification destination, the notification destination representing the information processing device and being preliminarily set in the femto base station;
 a management unit that starts the service to the user stored in the storage unit, upon receiving a change in the user equipment moving from an outside of coverage of the femtocell to an inside of the coverage, and that cancels the service to the user, upon receiving a change in the user equipment moving from the inside of the coverage to the outside of the coverage; and
 a unit that receives, from the femto base station, an instruction to change, add, or delete the service stored in the storage unit,
 wherein the service includes
  controlling an electronic equipment located in a place where the femto base station is located, the electronic equipment being different from the user equipment,
 wherein the service is stored in association further with IMSI (International Mobile Subscriber Identity) for identifying a subscriber that owns the user equipment and/or CSG ID (Closed Subscriber Group ID) for identifying a group to which the subscriber belongs,
 wherein the service with respect to the femtocell controlled by the femto base station is changed, added, or deleted in the storage unit based on the received instruction,
 wherein the notification destination is included in transmission data to be transmitted to the femto base station, the transmission data being compliant with a standard protocol in the communication system that provides the femtocell,
 wherein the notification destination is included in one of a parameter set by a maintenance management server that manages the femto base station, a parameter set by a gateway connected to a core network, and a parameter set by a packet core via a network, wherein the reception unit receives the change in camping from the femto base station, when the femto base station detects the change in camping of the user equipment and when monitoring information indicates that the user equipment needs to be monitored by the femto base station, the monitoring information being received by the femto base station and indicating whether or not the user equipment needs to be monitored by the femto base station, wherein the monitoring information is included in the transmission data, and wherein the monitoring information is included in one of the parameter set by the maintenance management server, the parameter set by the gateway, and the parameter set by the packet core.

3. A femto base station that controls a user equipment within a femtocell in a communication system providing the femtocell, the femto base station comprising:

a reception unit that receives a notification destination to be notified of a change in camping of the user equipment on the femtocell;

a notification unit that notifies the received notification destination of the change in camping of the user equipment, upon detection of the change in camping; and a unit that transmits, to an information processing device, an instruction to change, add, or delete restriction or addition of a function of the user equipment, wherein the notification destination is an information processing device that manages the user equipment, and that uses an OMA-DM (Open Mobile Alliance-Device Management) protocol for restricting or adding a function of the user equipment upon receiving a change in the user equipment moving from an outside of coverage of the femtocell to an inside of the coverage, and for cancelling the restriction or addition upon receiving a change in the user equipment moving from the inside of the coverage to the outside of the coverage, wherein the restriction or addition includes at least one of:
deactivating or activating a GPS (Global Positioning System) function of the user equipment; and
switching a mode of the user equipment to a manner mode or a drive mode, wherein the notification destination is included in transmission data to be transmitted to the femto base station, the transmission data being compliant with a standard protocol in the communication system that provides the femtocell, wherein the notification destination is included in one of a parameter set by a maintenance management server that manages the femto base station, a parameter set by a gateway connected to a core network, and a parameter set by a packet core via a network, wherein the reception unit further receives monitoring information indicating whether or not the user equipment needs to be monitored by the femto base station, wherein the notification unit notifies the received notification destination of the change in camping, when the femto base station detects the change in camping of the user equipment and when the monitoring information indicates that the user equipment needs to be monitored by the femto base station, wherein the monitoring information is included in the transmission data, and wherein the monitoring information is included in one of the parameter set by the maintenance management server, the parameter set by the gateway, and the parameter set by the packet core.

* * * * *